US012455969B2

(12) United States Patent
Hung et al.

(10) Patent No.: US 12,455,969 B2
(45) Date of Patent: Oct. 28, 2025

(54) VALIDATING READ-ONLY PORTIONS OF FIRMWARE OR A DOWNLOADED IMAGE THEREOF BY BOOT FIRMWARE VALIDATED BY SECURE FLASH MEMORY

(71) Applicant: Microsoft Technology Licensing, LLC, Redmond, WA (US)

(72) Inventors: Cheng-Yi Hung, Valencia, PA (US); Vimalraj Vasudevan Thekkoot, San Jose, CA (US); Rochak Chadha, Pittsburgh, PA (US); Gregory J. Zavertnik, Mountain House, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 105 days.

(21) Appl. No.: 18/477,498

(22) Filed: Sep. 28, 2023

(65) Prior Publication Data
US 2025/0111056 A1    Apr. 3, 2025

(51) Int. Cl.
*G06F 21/57*    (2013.01)
(52) U.S. Cl.
CPC ...... *G06F 21/575* (2013.01); *G06F 2221/033* (2013.01)
(58) Field of Classification Search
CPC .......................... G06F 21/575; G06F 2221/033
See application file for complete search history.

(56) References Cited

U.S. PATENT DOCUMENTS

| | | | |
|---|---|---|---|
| 10,592,669 B2 | 3/2020 | Gunti | |
| 11,003,780 B2 | 5/2021 | Liu | |
| 2014/0250291 A1* | 9/2014 | Adams | G06F 21/57 713/2 |
| 2016/0378990 A1 | 12/2016 | Goodman et al. | |
| 2017/0085383 A1 | 3/2017 | Rao et al. | |
| 2019/0073478 A1 | 3/2019 | Khessib et al. | |
| 2019/0258542 A1* | 8/2019 | Chaiken | G06F 11/1068 |
| 2020/0042710 A1 | 2/2020 | Liu et al. | |
| 2021/0019419 A1* | 1/2021 | Mathane | G06F 9/445 |
| 2021/0216638 A1* | 7/2021 | Park | G06F 21/74 |

(Continued)

OTHER PUBLICATIONS

International Search Report and Written Opinion received for PCT Application No. PCT/US2024/043121, mailed on Nov. 29, 2024, 11 pages.

(Continued)

*Primary Examiner* — Zahid Choudhury
(74) *Attorney, Agent, or Firm* — Wade IP Law PLLC

(57) ABSTRACT

Techniques are described herein in which boot firmware validated by secure flash memory validates read-only portions of firmware stored by the firmware or a downloaded image of the read-only portions. The secure flash memory validates a portion of the firmware, which includes the boot firmware and a reference hash of the read-only portions, by comparing a calculated hash of the portion and the reference hash of the portion. The boot firmware initiates a boot of the firmware and validates the read-only portions (or the downloaded image of the read-only portions) by comparing a calculated hash of the read-only portions (or a calculated hash of the downloaded image) and the reference hash of the read-only portions. The boot firmware completes the boot of the firmware based at least on the read-only portions (or the downloaded image) being validated.

20 Claims, 11 Drawing Sheets

(56) References Cited

U.S. PATENT DOCUMENTS

| | | | |
|---|---|---|---|
| 2022/0207145 A1* | 6/2022 | Young | G06F 21/575 |
| 2022/0207474 A1* | 6/2022 | Young | G06Q 10/0833 |
| 2022/0327215 A1 | 10/2022 | Preimesberger | |

OTHER PUBLICATIONS

"Create Key—Create Key", Retrieved from: https://learn.microsoft.com/en-US/rest/api/keyvault/keys/create-key/create-key?tabs=HTTP, Retrieved On: Jun. 20, 2023, 13 Pages.

"sign—sign", Retrieved from: https://learn.microsoft.com/en-us/rest/api/keyvault/keys/sign/sign?tabs=HTTP, Retrieved On: Jun. 20, 2023, 6 Pages.

* cited by examiner

VALIDATING READ-ONLY PORTIONS OF FIRMWARE OR A DOWNLOADED IMAGE THEREOF BY BOOT FIRMWARE VALIDATED BY SECURE FLASH MEMORY

BACKGROUND

Firmware often is stored on a secure flash memory that is tasked with validating the firmware as a prerequisite for booting up the firmware for execution on a device. If booting of the firmware begins before the firmware is validated, security of the device on which the firmware runs is reduced if the firmware has been compromised. The device on which the firmware runs typically allows a predefined amount of time for the validation of the firmware to be completed. If the validation cannot be completed within the predefined amount of time, the firmware traditionally cannot be booted up, and the device on which the firmware runs therefore cannot read the firmware from the secure flash memory. One proposed technique for addressing such a time constraint is to design a custom device that is configured to allow a sufficient amount of time for validation of the firmware to be completed. However, designing a custom device may consume a substantial amount of time and resources and typically results in a higher cost as compared to using an off-the-shelf device.

SUMMARY

It may be desirable to boot firmware for execution on a device when the device does not allow sufficient time for a secure flash memory that stores the firmware to fully validate the firmware before the firmware boots up. Firmware is computer software that provides low-level control for hardware of a device on which the firmware executes. For example, unified extensive firmware interface basic input/output system (UEFI BIOS) firmware provides low-level control for computer hardware devices. Baseboard management controller (BMC) firmware provides low-level control of a BMC microcontroller in accordance with intelligent platform management interface (IPMI) computer interface specifications. Other examples of a device on which firmware may run include but are not limited to a network interface controller (NIC) card, a solid-state drive (SSD), an Internet of things (IoT) device, a power supply unit (PSU), a motherboard, and an Azure® Data Box™ device developed and distributed by Microsoft Corporation. Flash memory is an electronic non-volatile computer memory storage medium that is capable of being electrically erased and reprogrammed. Example types of a flash memory include but are not limited to NOR flash and NAND flash.

By dividing validation responsibilities between the secure flash memory and boot firmware, which is included in the firmware stored on the secure flash memory, the firmware may be completely validated before a boot of the firmware is completed. The secure flash memory validates a portion of the firmware that includes the boot firmware within a time frame that is allowed by the device. In this manner, the secure flash memory serves as a hardware root of trust for the firmware. The boot firmware then validates the remainder of the firmware (e.g., read-only portions or an image thereof). A read-only portion of firmware is a region of the firmware to which the firmware does not write data while the firmware is running, though it will be recognized that the read-only portion may be updated during a firmware update process. It is not necessary for the boot firmware to complete the validation of the firmware within the time frame that is allowed by the device.

Various approaches are described herein for, among other things, validating read-only portions of firmware or a downloaded image thereof by boot firmware that is validated by a secure flash memory on which the firmware is stored. In a first example approach, a secure flash memory stores firmware. The firmware includes boot firmware, read-only portions, and a reference hash of the read-only portions. The secure flash memory calculates a hash of a designated portion of the firmware. The designated portion of the firmware includes the boot firmware and the hash of the read-only portions. The secure flash memory validates the designated portion of the firmware by comparing the calculated hash of the designated portion and a reference hash of the designated portion that is securely stored in the secure flash memory. The boot firmware initiates a boot of the firmware by calculating a hash of the read-only portions (e.g., based at least on (e.g., in response to or as a result of) the designated portion of the firmware being validated). The boot firmware validates the read-only portions by comparing the calculated hash of the read-only portions and the reference hash of the read-only portions (e.g., based at least on the designated portion of the firmware being validated). The boot firmware completes the boot of the firmware (e.g., based at least on the read-only portions being validated).

In a second example approach, a secure flash memory stores firmware. The firmware includes boot firmware, read-only portions, and a reference hash of the read-only portions. The secure flash memory validates a designated portion of the firmware, which includes the boot firmware and the hash of the read-only portions, based at least on a calculated hash of the designated portion and a reference hash of the designated portion that is securely stored in the secure flash memory being same. Based at least on the designated portion of the firmware being validated, the boot firmware initiates a boot of the firmware by unsuccessfully attempting to validate the read-only portions based at least on a calculated hash of the read-only portions and the reference hash of the read-only portions not being same. Based at least on validation of the read-only portions being unsuccessfully attempted, the boot firmware downloads an image of the read-only portions from a known server to main memory of a device on which the firmware executes. The boot firmware validates the image of the read-only portions based at least on a calculated hash of the image and the reference hash of the read-only portions being same. Based at least on the image of the read-only portions being validated, the boot firmware or runtime firmware replaces the read-only portions in the firmware with the image of the read-only portions. The boot firmware completes the boot of the firmware (e.g., based at least on the image of the read-only portions being validated).

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

Figure 1:
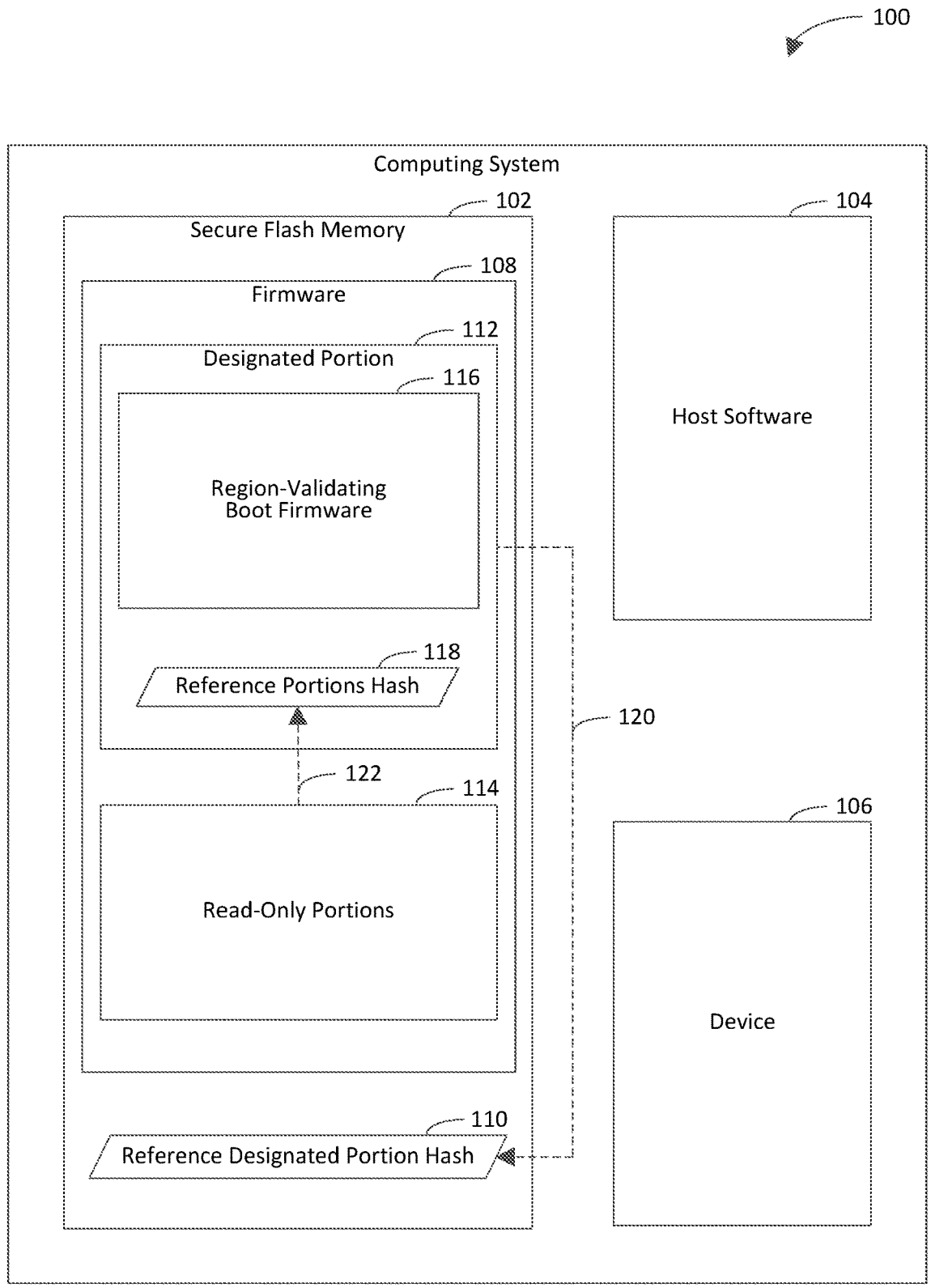
FIG. 1 is a block diagram of an example computing system in accordance with an embodiment.

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to boot firmware for execution on a device when the device does not allow sufficient time for a secure flash memory that stores the firmware to fully validate the firmware before the firmware boots up. Firmware is computer software that provides low-level control for hardware of a device on which the firmware executes. For example, unified extensive firmware interface basic input/output system (UEFI BIOS) firmware provides low-level control for computer hardware devices. Baseboard management controller (BMC) firmware provides low-level control of a BMC microcontroller in accordance with intelligent platform management interface (IPMI) computer interface specifications. Other examples of a device on which firmware may run include but are not limited to a network interface controller (NIC) card, a solid-state drive (SSD), an Internet of things (IoT) device, a power supply unit (PSU), a motherboard, and an Azure® Data Box™ device developed and distributed by Microsoft Corporation. Flash memory is an electronic non-volatile computer memory storage medium that is capable of being electrically erased and reprogrammed. Example types of a flash memory include but are not limited to NOR flash and NAND flash.

By dividing validation responsibilities between the secure flash memory and boot firmware, which is included in the firmware stored on the secure flash memory, the firmware may be completely validated before a boot of the firmware is completed. The secure flash memory validates a portion of the firmware that includes the boot firmware within a time frame that is allowed by the device. In this manner, the secure flash memory serves as a hardware root of trust for the firmware. The boot firmware then validates the remainder of the firmware (e.g., read-only portions or an image thereof). A read-only portion of firmware is a region of the firmware to which the firmware does not write data while the firmware is running, though it will be recognized that the read-only portion may be updated during a firmware update process. It is not necessary for the boot firmware to complete the validation of the firmware within the time frame that is allowed by the device.

Example embodiments described herein are capable of validating read-only portions of firmware or a downloaded image thereof by boot firmware that is validated by a secure flash memory on which the firmware is stored. Example techniques described herein have a variety of benefits as compared to conventional techniques for validating firmware. For instance, the example techniques are capable of ensuring that an entirety of the firmware is validated before booting of the firmware is completed, even if a device on which the firmware runs does not allow sufficient time for the secure flash memory to fully validate the firmware before the firmware boots up. The example techniques increase security of the device on which the firmware runs, for example, by reducing a likelihood that the firmware is compromised. For example, the secure flash memory validating a designated portion of the firmware, which includes boot firmware and a hash of the read-only portions of the firmware, and the boot firmware validating the read-only portions of the firmware may increase the security of the device. The example techniques do not require custom hardware in order to verify the entirety of the firmware. Rather, the example techniques are capable of using off-the-shelf hardware (e.g., electrical circuitry), firmware, and/or software to perform validation of the firmware. For example, the secure flash memory validating the designated portion of the firmware and the boot firmware validating the read-only portions of the firmware may enable the use of off-the-shelf hardware, firmware, and/or software. If validation of the firmware fails, the example techniques are capable of reporting an error (e.g., via a blinking system fault light-emitting diode (LED)) and recovering the firmware in a secure manner. For instance, the example techniques may replace the firmware with an image of the firmware after confirming that a hash of the image matches (e.g., is the same as) a reference hash of the firmware. Accordingly, the example techniques are capable of providing secure boot, secure attestation, and secure recovery for the firmware.

The example techniques reduce an amount of time and/or resources that is consumed to validate firmware. For instance, by using a secure flash memory to validate a portion (e.g., the designated region) of the firmware that includes boot firmware and using the boot firmware to validate a remainder (e.g., read-only portions) of the firmware, time and resources that otherwise would be consumed to develop a custom device on which to execute the firmware are avoided. Moreover, costs associated with developing the custom device to allow the secure flash memory sufficient time to fully validate the firmware are avoided. Accordingly, a cost associated with validating the firmware in accordance with any of the example techniques described herein may be less than a cost associated with conventional techniques for validating the firmware. By reducing the amount of time and/or resources that is consumed to validate the firmware, efficiency of a computing system that includes the secure flash memory and the device on which the firmware runs is increased.

The example techniques are capable of validating firmware more reliably than conventional techniques. For instance, by using a secure flash memory to validate a portion of the firmware that includes boot firmware and using the boot firmware to validate a remainder of the firmware, a likelihood that the validation of the firmware will fail as a result of the validation consuming more time than allowed by the device that executes the firmware is reduced. By reducing the likelihood that the validation of the firmware will fail, the example techniques improve (e.g., increase) a user experience and an efficiency of a user of the computing system that includes the secure flash memory and the device on which the firmware runs.

FIG. 1 is a block diagram of an example computing system 100 in accordance with an embodiment. A computing system is a system that includes a processing system comprising at least one processor that is capable of manipulating data in accordance with a set of instructions. For instance, a computing system may be a server computer, a desktop computer, a laptop computer, a tablet computer, a wearable computer such as a smart watch or a head-mounted computer, a personal digital assistant, a cellular telephone, an Internet of things (IoT) device, or the like. As shown in FIG. 1, the computing system 100 includes a secure flash memory 102, host software 104, and a device 106. The secure flash memory 102 stores firmware 108 and a reference designated portion hash 110. The firmware 108 includes a designated portion 112 and read-only portions 114. For instance, the designated portion 112 and/or the read-only portions 114 may be stored in read-only regions of the secure flash memory 102. In an aspect, the read-only portions 114 include a kernel, applications, libraries, and drivers (e.g., configurations), which are executed on the device 106. In another aspect, the read-only portions 114 are stored in consecutive memory locations of the secure flash memory 102. In yet another aspect, the read-only portions 114 are stored in non-consecutive memory locations of the secure flash memory 102. The reference designated portion hash 110 is a hash of the designated portion 112 as indicated by arrow 120. The designated portion 112 includes portion-validating boot firmware 116 and a reference portions hash 118. The reference portions hash 118 is a hash of the read-only portions 114 as indicated by arrow 122. For example, the reference portions hash 118 may include (e.g., be) a single hash of the entirety of the read-only portions 114. In another example, the reference portions hash 118 may include multiple hashes of the respective read-only portions 114. If the read-only portions 114 are stored in non-consecutive memory locations of the secure flash memory 102, the reference portions hash 118 includes multiple hashes. For instance, the reference portions hash 118 may include at least one hash corresponding to each non-consecutive memory location. In an aspect, the secure flash memory 102 is a non-volatile memory. In another aspect, the secure flash memory 102 serves as a root of trust for the firmware 108.

In a first example embodiment, the secure flash memory 102 calculates a hash of the designated portion 112. The secure flash memory 102 validates the designated portion 112 by comparing the calculated hash of the designated portion 112 and the reference designated portion hash 110. In an aspect, the secure flash memory 102 validates the designated portion 112 based at least on the calculated hash of the designated portion 112 and the reference designated portion hash 110 being the same. The secure flash memory 102 informs the portion-validating boot firmware 116 that the designated portion 112 is validated, which triggers the portion-validating boot firmware 116 to initiate a boot of the firmware 108 by calculating a hash of the read-only portions 114. The portion-validating boot firmware 116 validates the read-only portions 114 by comparing the calculated hash of the read-only portions 114 and the reference region hash 118. In an aspect, the portion-validating boot firmware 116 validates the read-only portions 114 based at least on the calculated hash of the read-only portions 114 and the reference region hash 118 being the same. In response to the read-only portions 114 being validated, the portion-validating boot firmware 116 completes the boot of the firmware 108.

In a second example embodiment, the secure flash memory 102 validates the designated portion 112 based at least on a calculated hash of the designated portion 112 and the reference designated portion hash 110 being the same. The secure flash memory 102 informs the portion-validating boot firmware 116 that the designated portion 112 is validated, which triggers the portion-validating boot firmware 116 to initiate a boot of the firmware 108, which includes unsuccessfully attempting to validate the read-only portions 114 because a calculated hash of the read-only portions 114 and the reference portions hash 118 are not the same. Based at least on validation of the read-only portions 114 being unsuccessfully attempted, the portion-validating boot firmware 116 downloads an image of the read-only portions 114 from a known server to main memory of the device 106. The portion-validating boot firmware 116 validates the image of the read-only portions 114 based at least on a calculated hash of the image and the reference portions hash 118 being the same. Based at least on the image of the read-only portions 114 being validated, the portion-validating boot firmware 116 or runtime firmware (i.e., the firmware 108 that runs on the device 106 during runtime) replaces the read-only portions 114 with the image of the read-only portions 114. Based at least on the image of the read-only portions 114 being validated, the portion-validating boot firmware 116 completes the boot of the firmware 108.

The host software 104 enables secure functionality on the secure flash memory 102. In an aspect, the secure flash memory 102 initially is configured as a normal flash memory (i.e., without secure functionality, which enables the secure flash memory 102 to perform certain operations in accordance with the example embodiments described herein, being turned on). In accordance with this aspect, the host software 104 converts the normal flash memory into the secure flash memory 102 by causing the secure functionality to be turned on. In another aspect, the host software 104 executes on an operating system that executes on the computing system 100.

The device 106 executes the firmware 108. In an aspect, the device 106 executes the portion-validating boot firmware 116 in response to the secure flash memory 102 loading the portion-validating boot firmware 116 into main memory of the device 106. In another aspect, the device 106 executes the read-only portions 114 in response to the portion-validating boot firmware 116 loading the read-only portions 114 into the main memory of the device 106.

In an aspect, each of the firmware 108 and the host software 104 is implemented as computer program code configured to be executed in a processing system (e.g., one or more processors). For example, the host software 104 may be executed on a processing system of the computing system 100, and the firmware 108 may be executed on a processing system of the device 106. In another aspect, each of the secure flash memory 102 and the device 106 is implemented in hardware logic/electrical circuitry. Such hardware logic/electrical circuitry may include one or more hardware logic components. Examples of a hardware logic component include a field-programmable gate array (FPGA), an application-specific integrated circuit (ASIC), an application-specific standard product (ASSP), a system-on-a-chip system (SoC), and a complex programmable logic device (CPLD). Each SoC may include an integrated circuit chip that includes one or more of a processor (e.g., a microcontroller, microprocessor, or digital signal processor (DSP)), memory, one or more communication interfaces, and/or further circuits and/or embedded firmware to perform its functions.

Figure 2A:
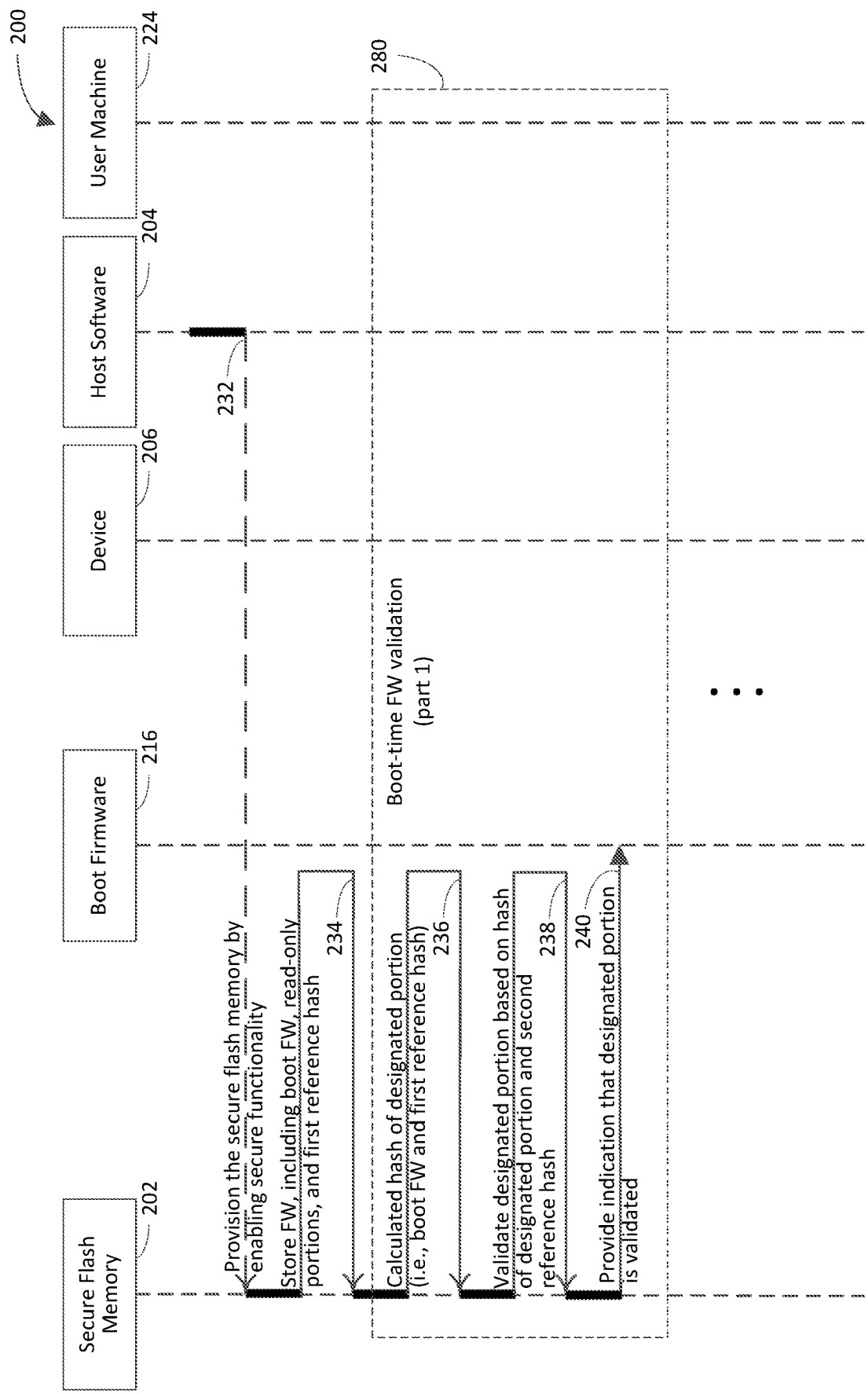
FIGS. 2A-2D are respective portions of an example activity diagram for validating read-only portions of firmware by boot firmware that is validated by a secure flash memory on which the firmware is stored in accordance with an embodiment.
Figure 2B:
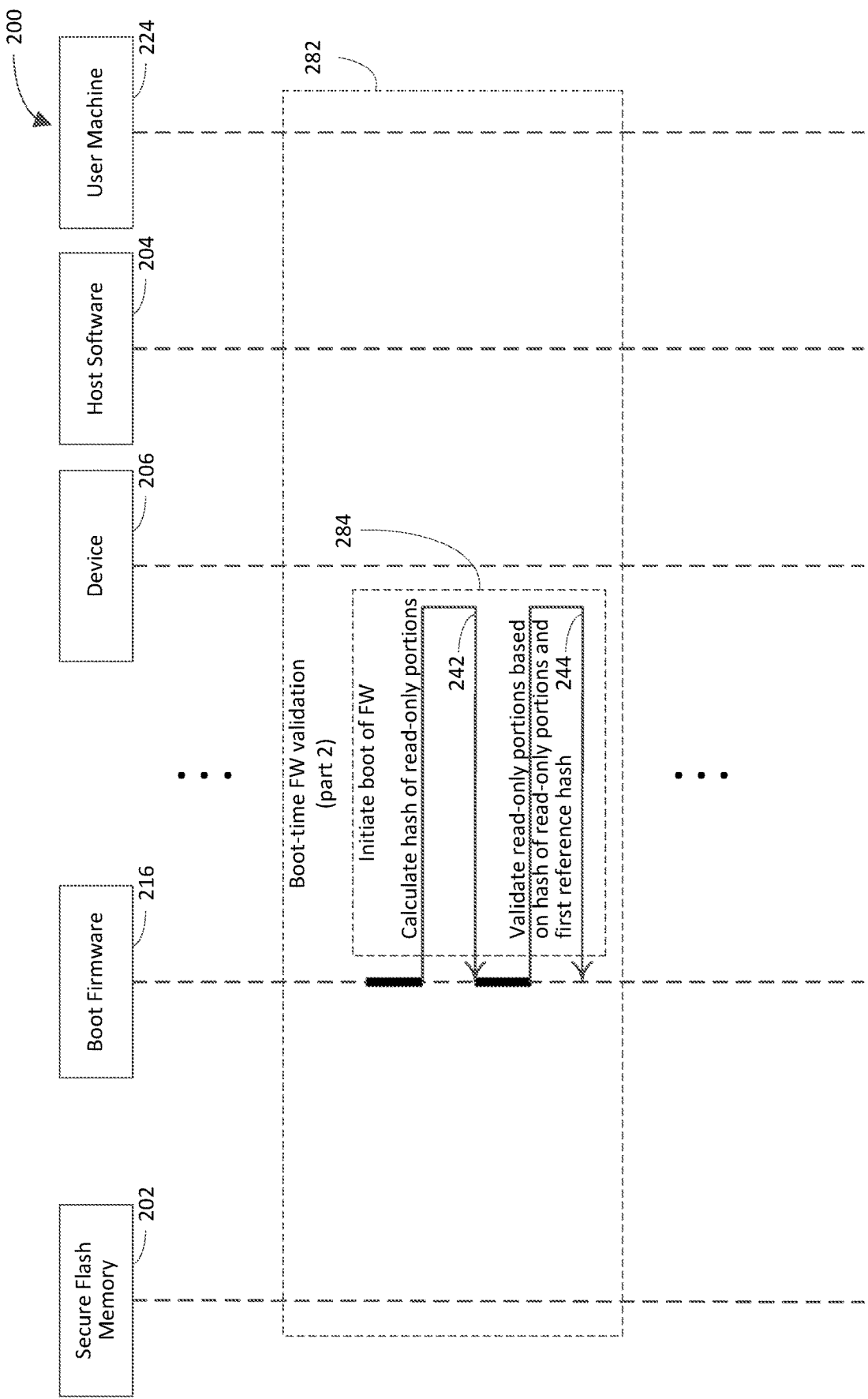
Figure 2C:
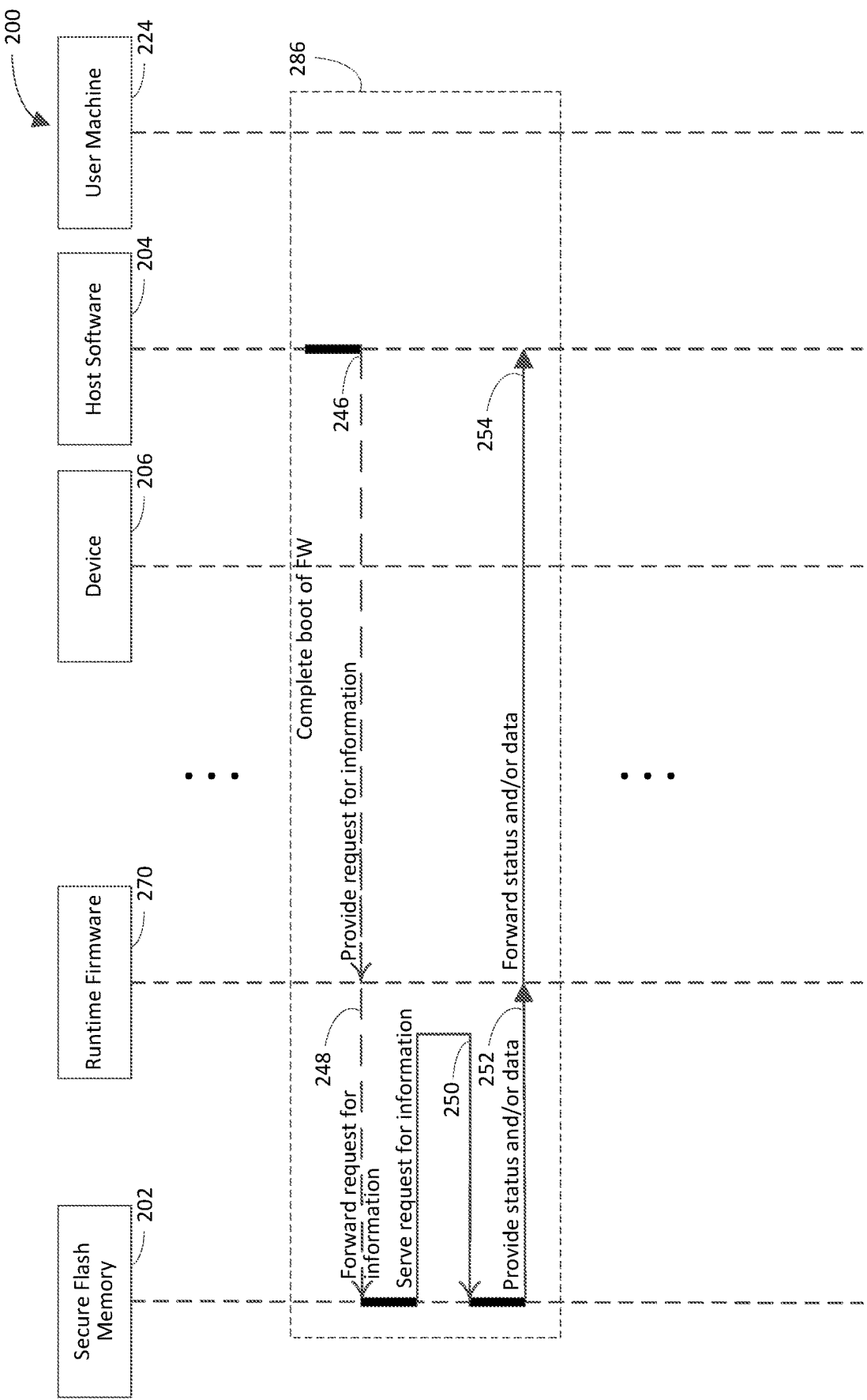
Figure 2D:
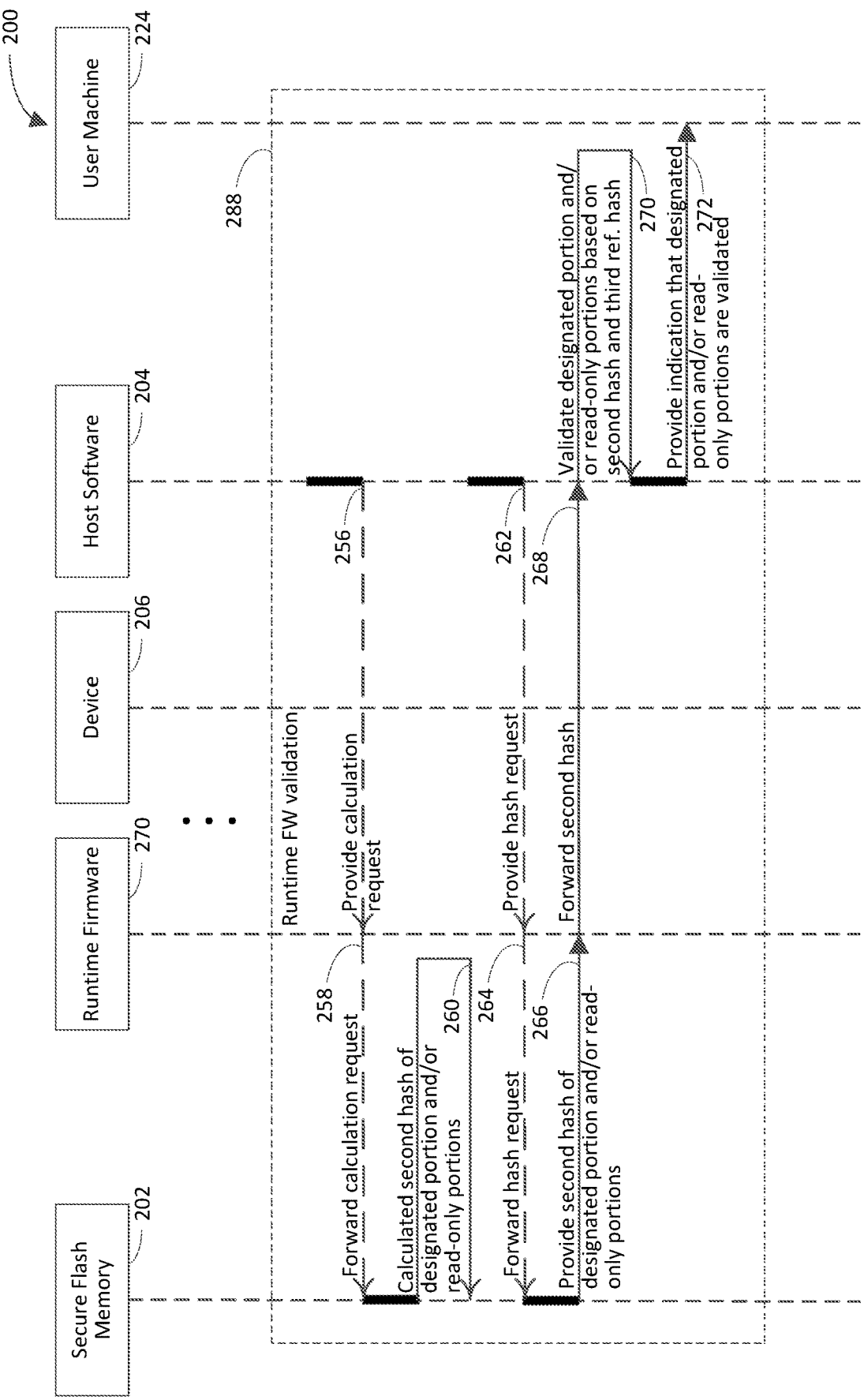

FIGS. 2A-2D are respective portions of an example activity diagram 200 for validating read-only portions of firmware by boot firmware that is validated by a secure flash memory on which the firmware is stored in accordance with an embodiment. Each of FIGS. 2A-2B depicts a secure flash memory 202, boot firmware 216, a device 206, host software 204, and a user machine 224. The boot firmware 216 shown in FIGS. 2A-2B has been replaced with runtime firmware 270 in FIGS. 2C-2D. Accordingly, each of FIGS. 2C-2D depicts the secure flash memory 202, the runtime firmware 270, the device 206, the host software 204, and the user machine 224. In FIG. 2A, a first part of a boot-time firmware validation, as performed by the secure flash memory 202, is described. Activities involved in the first part of the boot-time firmware validation are included in dashed box 280. In FIG. 2B, a second part of the boot-time firmware validation, as performed by the boot firmware 216, is described. Activities involved in the second part of the boot-time firmware validation are included in dashed box 282. The second part of the boot-time firmware validation includes initiation of a boot of the firmware, which is controlled by the boot firmware 216. The initiation of the boot of the firmware is represented by dashed box 284. In FIG. 2C, completion of the boot of the firmware, which is controlled by the runtime firmware 270, is described. The completion of the boot of the firmware is represented by dashed box 286. In FIG. 2D, runtime firmware validation, which is collaboratively performed by the secure flash memory 202, the runtime firmware 270, the device 206, and the host software 204, is described. The runtime firmware validation is represented by dashed box 288. It will be recognized that the runtime firmware validation is optional because the firmware will have already been validated during boot-time, as shown in FIGS. 2A-2B. Activities 232, 234, 236, 238, 240, 242, 244, 246, 248, 250, 252, 254, 256, 258, 260, 262, 264, 266, 268, 270, and 272 will now be described with reference to the secure flash memory 202, the boot firmware 216, the device 206, the host software 204, and the user machine 224.

In activity 232, the host software 204 provisions the secure flash memory 202 by enabling secure functionality. For instance, provisioning the secure flash memory 202 may involve converting a non-secure flash memory into the secure flash memory 202 by enabling the secure functionality that was not enabled in the non-secure flash memory.

In activity 234, the secure flash memory 202 stores firmware (e.g., the firmware 108 shown in FIG. 1). The firmware includes boot firmware, read-only portions, and a first reference hash. For instance, the boot firmware, the read-only portions, and the first reference hash may correspond to the portion-validating boot firmware 116, the read-only portions 114, and the reference portions hash 118 shown in FIG. 1. The first reference hash is a pre-calculated hash of the read-only portions. Accordingly, the first reference hash is calculated before the secure flash memory 202 stores the boot firmware.

In activity 236, the secure flash memory 202 calculates a hash of a designated portion of the firmware. The designated portion includes the boot firmware and the first reference hash.

In activity 238, the secure flash memory 202 validates the designated portion based on the hash of the designated portion and a second reference hash (e.g., the reference designated portion hash 110 shown in FIG. 1). For instance, the secure flash memory 202 may validate the designated portion based on the hash of the designated portion and the second reference hash being the same. The second reference hash is a pre-calculated hash of the designated portion of the firmware. Accordingly, the second reference hash is calculated before the secure flash memory 202 stores the boot firmware.

In activity 240, the secure memory 202 provides a first validation indicator, which indicates that the designated portion is validated, to the boot firmware 216.

The activity diagram 200 continues in FIG. 2B. Referring to FIG. 2B, in activity 242, the boot firmware 216 calculates a hash of the read-only portions.

In activity 244, the boot firmware 216 validates the read-only portions based on the hash of the read-only portions and the first reference hash. For instance, the boot firmware 216 may validate the read-only portions based on the hash of the read-only portions and the first reference hash being the same.

The activity diagram 200 continues in FIG. 2C. Referring to FIG. 2C, in activity 246, the host software 204 provides a request for information to the runtime firmware 270.

In activity 248, the runtime firmware 270 forwards the requests for the information to the secure flash memory 202.

In activity 250, the secure flash memory 202 serves the request for the information.

In activity 252, the secure flash memory 202 provides a status and/or data, which are responsive to the request, to the runtime firmware 270.

In activity 254, the runtime firmware 270 forwards the status and/or the data to the host software 204.

The activity diagram 200 continues in FIG. 2D. Referring to FIG. 2D, in activity 256, the host software 204 provides a calculation request, which requests calculation of a second hash of the designated portion and/or the read-only portions, to the runtime firmware 270.

In activity 258, the runtime firmware 270 forwards the calculation request to the secure flash memory 202.

In activity 260, the secure flash memory 202 calculates the second hash of the designated portion of the firmware or the read-only portions of the firmware.

In activity 262, the host software 204 provides a hash request, which requests the second hash that was calculated in activity 260, to the runtime firmware 270.

In activity 264, the runtime firmware 270 forwards the hash request to the secure flash memory 202.

In activity 266, the secure flash memory 202 provides the second hash to the runtime firmware 270.

In activity 268, the runtime firmware 270 forwards the second hash to the host software 204.

In activity 270, the host software 204 validates the designated portion and/or the read-only portions based on the second hash and a third reference hash. For instance, the host software 204 may validate the designated portion and/or the read-only portions based on the second hash of the designated portion and the third reference hash being the same. The third reference hash is a pre-calculated hash of the designated portion and/or the read-only portions of the firmware that is calculated by a trusted entity, which is not the host software 204, before the host software 204 receives the second hash from the secure flash memory 202.

In activity 272, the host software 204 provides a second validation indicator, which indicates that the designated portion and/or the read-only portions are validated, to the user machine 224.

In some example embodiments, one or more of the activities 232, 234, 236, 238, 240, 242, 244, 246, 248, 250, 252, 254, 256, 258, 260, 262, 264, 266, 268, 270, and/or 272 of the activity diagram 200 may not be performed. Moreover, activities in addition to or in lieu of the activities 232, 234, 236, 238, 240, 242, 244, 246, 248, 250, 252, 254, 256, 258, 260, 262, 264, 266, 268, 270, and/or 272 may be performed.

Figure 3:
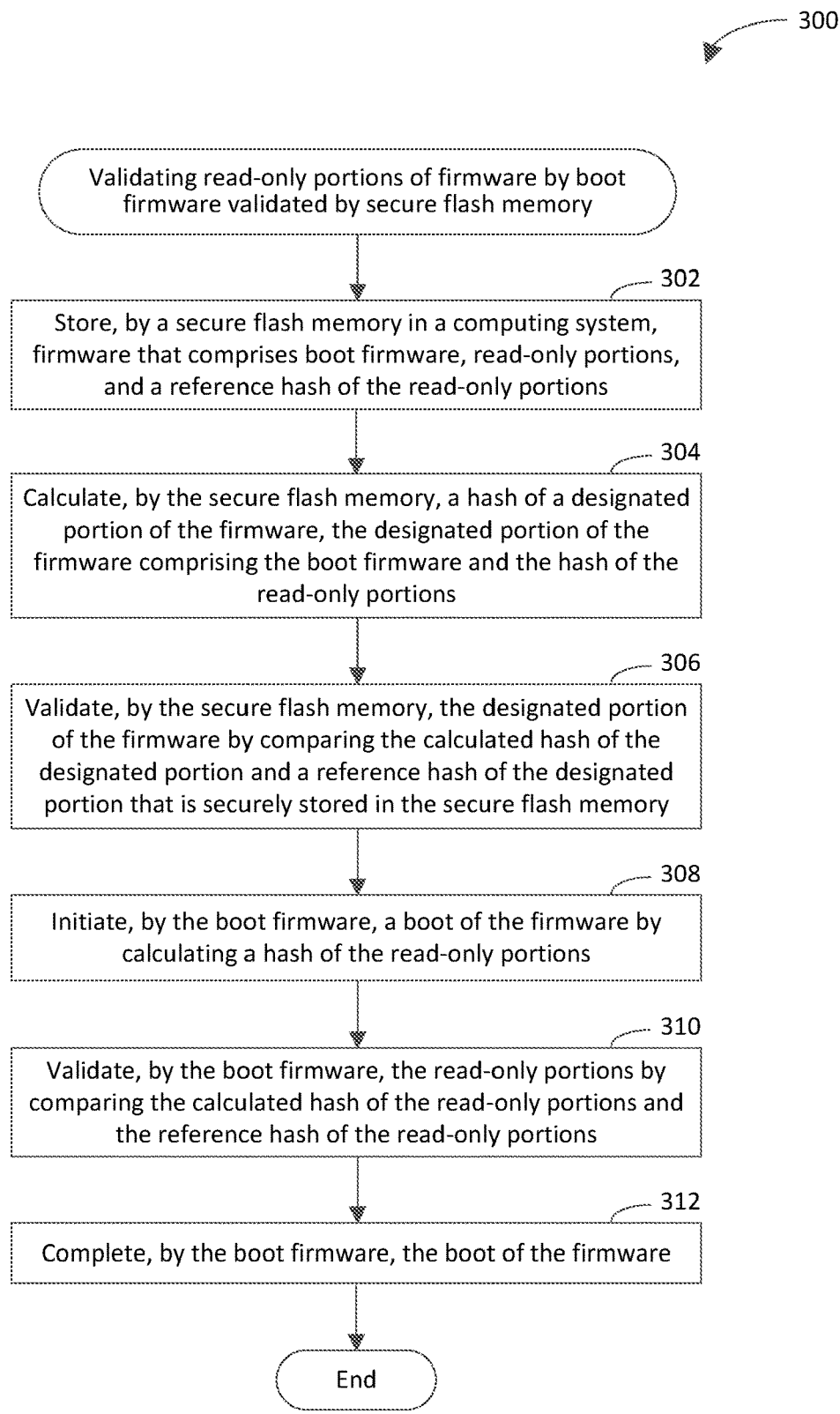
FIG. 3 depicts a flowchart of an example method for validating read-only portions of firmware by boot firmware that is validated by a secure flash memory on which the firmware is stored in accordance with an embodiment.
Figure 4:
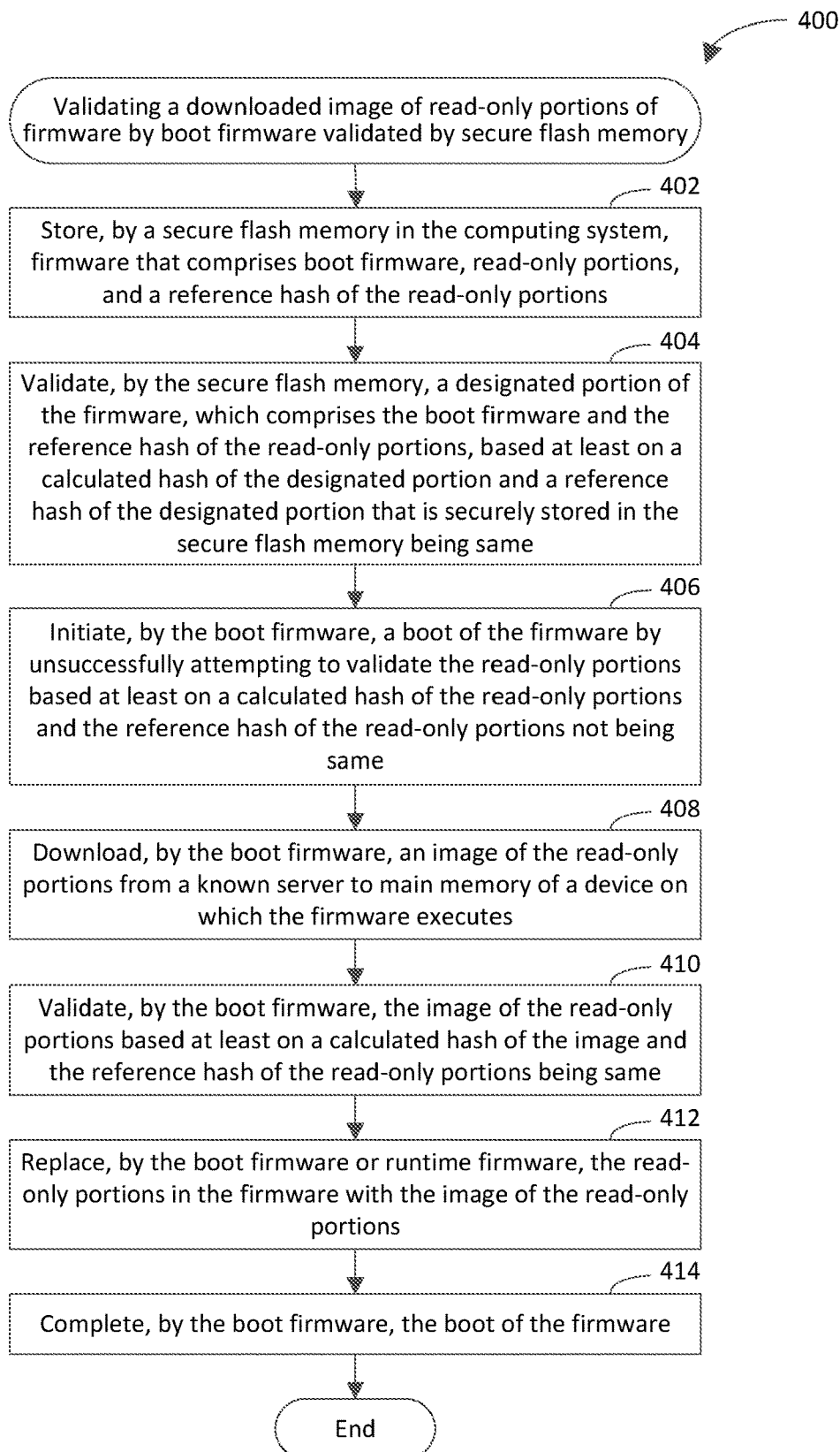
FIGS. 4-6 depict flowcharts of example methods for validating a downloaded image of read-only portions of firmware by boot firmware that is validated by a secure flash memory on which the firmware is stored in accordance with embodiments.
Figure 5:
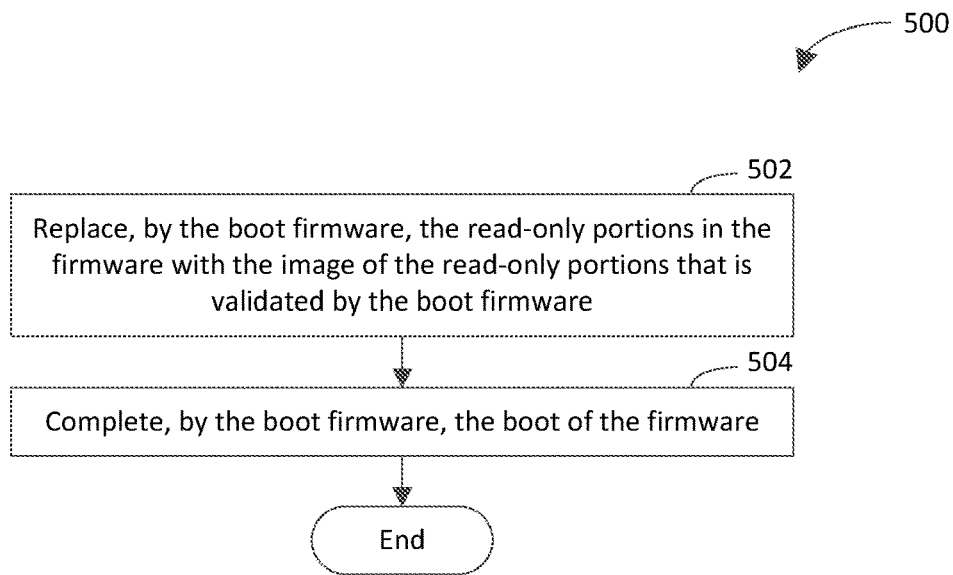
Figure 6:
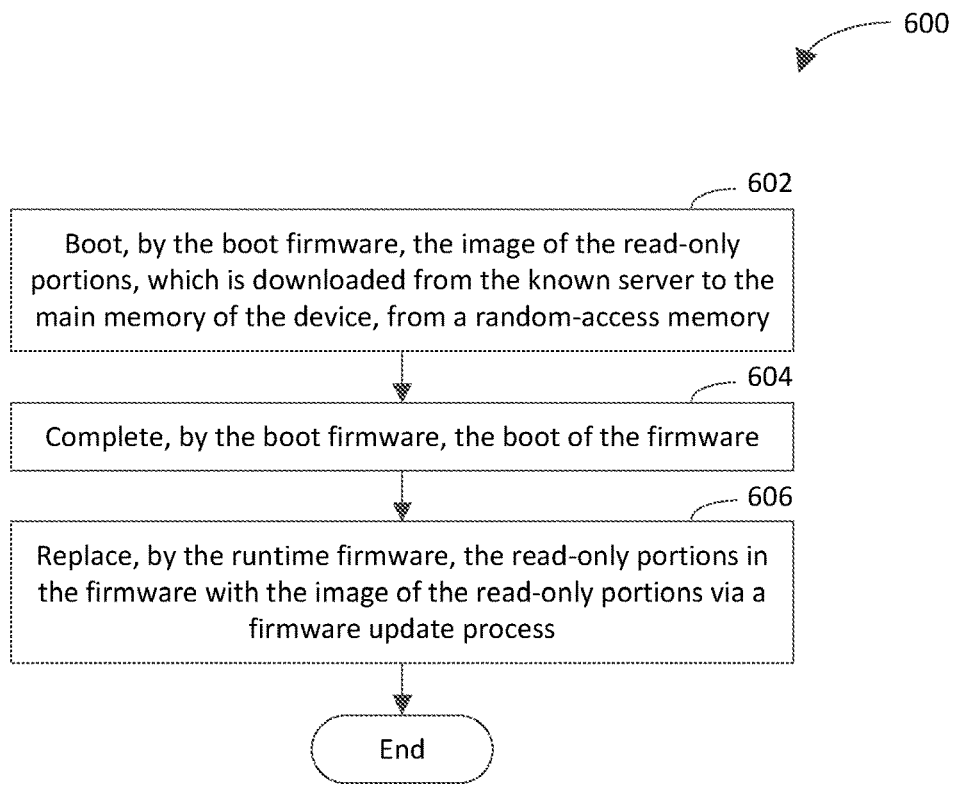
Figure 7:
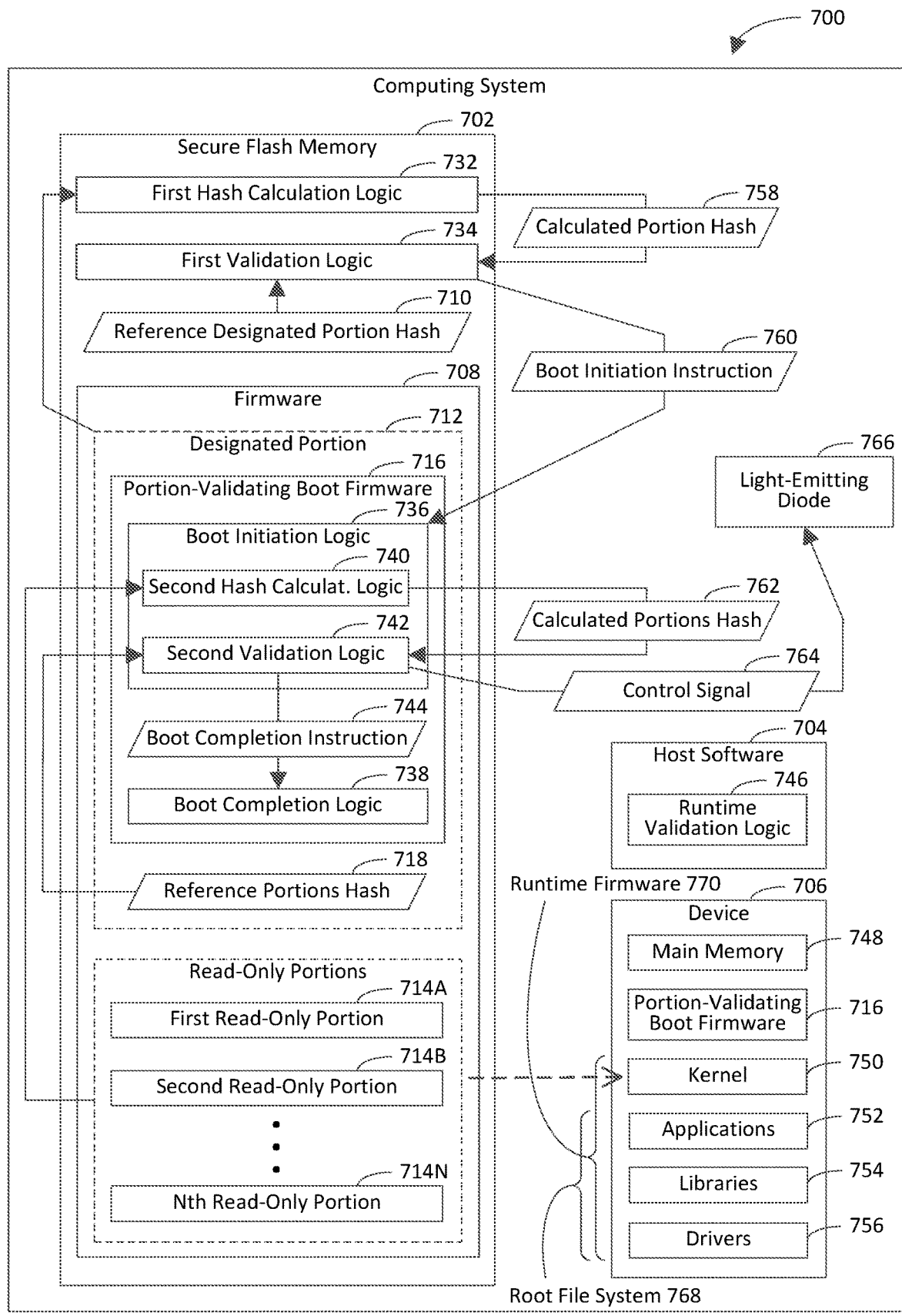
FIG. 7 is a block diagram of an example computing system in accordance with an embodiment.

FIG. 3 depicts a flowchart 300 of an example method for validating read-only portions of firmware by boot firmware that is validated by a secure flash memory on which the firmware is stored in accordance with an embodiment. FIGS. 4-6 depict flowcharts 400, 500, and 600 of example methods for validating a downloaded image of read-only portions of firmware by boot firmware that is validated by a secure flash memory on which the firmware is stored in accordance with embodiments. Flowcharts 300, 400, 500, and 600 may be performed by the computing system 100, shown in FIG. 1, for example. For illustrative purposes, flowcharts 300, 400, 500, and 600 are described with respect to computing system 700 shown in FIG. 7, which is an example implementation of the computing system 100. As shown in FIG. 7, the computing system 700 includes a secure flash memory 702, host software 704, a device 706, and a light-emitting diode 766. The secure flash memory 702 includes first hash calculation logic 732, first validation logic 734, firmware 708, and a reference designated portion hash 710. The firmware 708 includes a designated portion 712 and read-only portions 714A-714N. In an aspect, the designated portion 712 and the read-only portions 714A-714N are designated as "read-only" in an extensible markup language (XML) file. The designated portion 712 includes portion-validating boot firmware 716 and a reference portions hash 718. The portion-validating boot firmware 716 includes boot initiation logic 736 and boot completion logic 738. The boot initiation logic 736 includes second hash calculation logic 740 and second validation logic 742. The host software 704 includes runtime validation logic 746, which is configured to perform validation of the firmware 708 during runtime of the firmware 708. The device 706 executes a kernel 750, applications 752, libraries 754, and drivers 756, all of which are loaded from the read-only portions 714A-714N. Accordingly, the kernel 750, the applications 752, the libraries 754, and the drivers 756 are stored in one or more of the read-only portions 714A-714N. The kernel 750, the applications 752, the libraries 754, and the drivers 756 are referred to collectively as runtime firmware 770, which runs on the device 706 during runtime. The applications 752, the libraries 754, and the drivers 756 are referred to collectively as a root file system 768. The kernel 750 is referred to herein as "the kernel 750 of the device 706." The device 706 executes the portion-validating boot firmware 716 during the boot of the firmware 708. The device 706 includes main memory 748. Further structural and operational embodiments will be apparent to persons skilled in the relevant art(s) based on the discussion regarding flowcharts 300, 400, 500, and 600.

As shown in FIG. 3, the method of flowchart 300 begins at step 302. In step 302, firmware is stored by a secure flash memory. The firmware comprises boot firmware, read-only portions, and a reference hash of the read-only portions. In an example implementation, the secure flash memory 702 stores the firmware 708, which includes the portion-validating boot firmware 716, the read-only portions 714A-714N, and the reference portions hash 718. The reference portions hash 718 is a reference hash of the read-only portions 714A-714N.

In an example embodiment, the designated portion of the firmware is included in a manifest that is signed with a signing key of a trusted entity. For instance, the trusted entity may be the secure flash memory. In accordance with this embodiment, the manifest may be programmed (e.g., written) into the secure flash memory.

In an aspect of this embodiment, the manifest includes metadata that specifies a size of the designated portion of the firmware and a start address of the designated portion. For example, the metadata may specify a size of the boot firmware and a start address of the boot firmware and further specify a size of the reference hash of the read-only portions and a start address of the reference hash of the read-only portions.

At step 304, a hash of a designated portion of the firmware is calculated by the secure flash memory. The designated portion of the firmware comprises the boot firmware and a hash of the read-only portions. The hash of the designated portion is calculated using a hash function. In an aspect, the hash function is capable of being used to map data of an arbitrary size to a fixed-size value. In accordance with this aspect, the hash of the designated portion may be calculated by processing the designated portion using a one-way digest function, which results in the hash of the designated portion being a fixed length string. Examples of a hash function that may be used to calculate the hash of the designated portion include a SHA-256 hash function and a SHA-512 hash function. In an example implementation, the first hash calculation logic 732 calculates a hash of the designated portion 712 of the firmware 708 to provide a calculated portion hash 758.

In an example embodiment, calculation of the hash of the designated portion of the firmware at step 304 is triggered by the secure flash memory being powered on. In an aspect of this embodiment, the secure flash memory being powered on includes an alternating current (AC) power being applied to the secure flash memory. In another aspect of this embodiment, the secure flash memory being powered on includes a direct current (DC) power being applied to the secure flash memory.

At step 306, the designated portion of the firmware is validated by the secure flash memory. The designated firmware is validated by comparing the calculated hash of the designated portion and a reference hash of the designated portion that is securely stored in the secure flash memory. In an example implementation, the first validation logic 734 validates the designated portion 712 of the firmware 708 by comparing the calculated portion hash 758 and a reference designated portion hash 710, which is a reference hash of the designated portion 712. In accordance with this implementation, the first validation logic 734 provides a boot initiation instruction 760 to the boot initiation logic 736 based on the designated portion 712 being validated. The boot initiation instruction 760 instructs the boot initiation logic 736 to initiate a boot of the firmware 708.

At step 308, a boot of the firmware is initiated by the boot firmware. The boot of the firmware is initiated by calculating a hash of the read-only portions. For instance, the boot of the firmware may be initiated based at least on the designated portion of the firmware being validated. The hash of the read-only portions is calculated using a hash function. In an aspect, the hash of the read-only portions is calculated by processing the read-only portions using a one-way digest function, which results in the hash of the read-only portions being a fixed length string. Examples of a hash function that may be used to calculate the hash of the read-only portions include a SHA-256 hash function and a SHA-512 hash function. In an example implementation, the second hash calculation logic 740 initiates a boot of the firmware 708 by calculating a hash of the read-only portions 714A-714N to provide a calculated portions hash 762. In accordance with this implementation, the second hash calculation logic 740 initiates the boot of the firmware 708 based on receipt of the boot initiation instruction 760 from the first validation logic 734.

In an example embodiment, calculation of the hash of the read-only portions at step 308 is triggered by a reboot of the device on which the firmware executes. In an aspect of this embodiment, the device being rebooted involves the device being restarted. The reboot may be a hard reboot, a warm reboot, or a cold reboot. A hard reboot of the device is defined by power to the device being physically turned off and then turned back on. A warm reboot of the device is defined by the device restarting while remaining powered up (i.e., without power to the device being physically turned off). A cold reboot of the device is defined by the device starting from a powerless state and performing a power-on self-test (POST).

At step 310, the read-only portions are validated by the boot firmware. The read-only portions are validated by comparing the calculated hash of the read-only portions and the reference hash of the read-only portions. For instance, the read-only portions may be validated based at least on the designated portion of the firmware being validated. In an example implementation, the second validation logic 742 validates the read-only portions 714A-714N by comparing the calculated portions hash 762 and the reference portions hash 718. In accordance with this implementation, the second validation logic 742 provides a boot completion instruction 744 to the boot completion logic 738 based on the read-only portions 714A-714N being validated. The boot completion instruction 744 instructs the boot completion logic 738 to complete the boot of the firmware 708.

At step 312, the boot of the firmware is completed by the boot firmware. For instance, the boot of the firmware may be completed based at least on the read-only portions being validated. In an example implementation, the boot completion logic 738 completes the boot of the firmware 708 based on receipt of the boot completion instruction 744 from the second validation logic 742.

In some example embodiments, one or more steps 302, 304, 306, 308, 310, and/or 312 of flowchart 300 are not performed. Moreover, steps in addition to or in lieu of steps 302, 304, 306, 308, 310, and/or 312 may be performed. For instance, in an example embodiment, the method of flowchart 300 further includes provisioning, by host software, the secure flash memory by enabling a secure functionality. For example, the host software may provision the secure flash memory by converting a non-secure flash memory into the secure flash memory. In accordance with this example, converting the non-secure flash memory into the secure flash memory may include enabling the secure functionality that was not enabled in the non-secure flash memory. In an aspect of this embodiment, the host software includes a software development kit (SDK) that provisions the secure flash memory by enabling the secure functionality. In another aspect of this embodiment, provisioning the secure flash memory includes provisioning the boot firmware in the secure flash memory. In accordance with this aspect, provisioning the secure flash memory includes provisioning the reference hash of the read-only portions in the secure flash memory. In an example implementation, the host software 704 provisions the secure flash memory 702 by enabling the secure functionality.

In another example embodiment, the method of flowchart 300 further includes changing, by host software, a state of the designated portion of the firmware from a read-only state in which designated portion is not capable of being updated by the firmware to a writeable state in which the designated portion is capable of being updated by the firmware. In an example implementation, the host software 704 changes a state of the designated portion 712 of the firmware 708 from a read-only state in which designated portion 712 is not capable of being updated by the firmware 708 to a writeable state in which the designated portion 712 is capable of being updated by the firmware 708. In accordance with this embodiment, the method of flowchart 300 further includes, based at least on the state of the designated portion of the firmware being changed from the read-only state to the writable state, updating, by the host software, the designated portion of the firmware. In an example implementation, the host software 704 updates the designated portion 712 based at least on the state of the designated portion 712 being changed from the read-only state to the writable state.

In yet another example embodiment, the method of flowchart 300 further includes causing, by the boot firmware, a kernel of a device on which the firmware executes to initiate a boot of a root file system, to mount the root file system, and to call an application, which launches other applications, on the root file system. In an example implementation, the boot completion logic 738 causes the kernel 750 of the device 706 on which the firmware 708 executes to initiate a boot of the root file system 768, to mount the root file system 768, and to call an application, which launches other applications, on the root file system 768.

As shown in FIG. 4, the method of flowchart 400 begins at step 402. In step 402, firmware is stored by a secure flash memory. The firmware comprises boot firmware, read-only portions, and a reference hash of the read-only portions. In an example implementation, the secure flash memory 702 stores the firmware 708, which includes the portion-validating boot firmware 716, the read-only portions 714A-714N, and the reference portions hash 718. The reference portions hash 718 is a reference hash of the read-only portions 714A-714N.

At step 404, a designated portion of the firmware is validated by the secure flash memory. The designated portion of the firmware comprises the boot firmware and the reference hash of the read-only portions. In an example implementation, the first validation logic 734 validates the designated portion 712 of the firmware 708. In an aspect, the first hash calculation logic 732 calculates a hash of the designated portion 712 of the firmware 708 to provide a calculated portion hash 758. In accordance with this aspect, the first validation logic 734 validates the designated portion 712 of the firmware 708 by comparing the calculated portion hash 758 and a reference designated portion hash 710, which is a reference hash of the designated portion 712. For instance, the first validation logic 734 may validate the designated portion 712 of the firmware 708 based on the calculated portion hash 758 and the reference designated portion hash 710 being same. In accordance with this implementation, the first validation logic 734 provides a boot initiation instruction 760 to the boot initiation logic 736 based on the designated portion 712 being validated. The boot initiation instruction 760 instructs the boot initiation logic 736 to initiate a boot of the firmware 708.

At step 406, a boot of the firmware is initiated by the boot firmware by unsuccessfully attempting to validate the read-only portions based on at least on a calculated hash of the read-only portions and the reference hash of the read-only portions not being same. For instance, the boot of the firmware may be initiated based at least on the designated portion of the firmware being validated. In an example implementation, the portion-validating boot firmware 716 initiates a boot of the firmware 708 by unsuccessfully attempting to validate the read-only portions 714A-714N based on at least on a calculated portions hash 762, which is a calculated hash of the read-only portions 714A-714N, and the reference portions hash 718 not being same. In an aspect, the second hash calculation logic 740 calculates the hash of the read-only portions 714A-714N based on receipt of the boot initiation instruction 760 from the first validation logic 734. In accordance with this aspect, the second validation logic 742 fails to validate the read-only portions 714A-714N based at least on the calculated portions hash 762 and the reference portions hash 718 not being the same.

At step 408, an image of the read-only portions is downloaded by the boot firmware from a known server to main memory of a device on which the firmware executes. For instance, the image of the read-only portions may be downloaded based at least on validation of the read-only portions being unsuccessfully attempted. In an example implementation, the second validation logic 742 downloads an image of the read-only portions 714A-714N from the known server to the main memory 748 of the device 706.

At step 410, the image of the read-only portions is validated by the boot firmware based at least on a calculated hash of the image and the reference hash of the read-only portions being same. In an example implementation, the second validation logic 742 validates the image of the read-only portions 714A-714N based at least on a calculated hash of the image and the reference portions hash 718 being same. In an aspect, the second hash calculation logic 740 calculates a hash of the image to provide the calculated hash of the image. In accordance with this aspect, the second validation logic compares the calculated hash of the image and the reference portions hash 718 to determine that the calculated hash of the image and the reference portions hash 718 are the same.

At step 412, the read-only portions in the firmware are replaced (e.g., overwritten) with the image of the read-only portions by the boot firmware or runtime firmware. For instance, the read-only portions in the firmware may be replaced with the image of the read-only portions based at least on the image of the read-only portions being validated. The runtime firmware is the firmware that runs on the device during runtime. In an aspect, the read-only portions in the firmware are replaced by deleting the read-only portions from unlocked read-only regions of the secure flash memory and then writing the image of the read-only portions into the unlocked read-only regions from which the read-only portions were deleted. In another aspect, the replacement is performed using an atomic transaction. An atomic transaction is an indivisible and irreducible series of operations such that either all of the operations in the series are performed or none of the operations in the series are performed. In accordance with this aspect, all of the read-only portions in the firmware are replaced with the image of all of the read-only portions in accordance with the atomic transaction. In an example implementation, the second validation logic 742 or the firmware 708 that runs on the device 706 during runtime replaces the read-only portions 714A-714N in the firmware 708 with the image of the read-only portions 714A-714N.

At step 414, the boot of the firmware is completed by the boot firmware. For instance, the boot of the firmware may be completed based at least on the image of the read-only portions being validated. In an example implementation, the boot completion logic 738 completes the boot of the firmware 708.

In some example embodiments, one or more steps 402, 404, 406, 408, 410, 412, and/or 414 of flowchart 400 are not performed. Moreover, steps in addition to or in lieu of steps 402, 404, 406, 408, 410, 412, and/or 414 may be performed. For instance, in an example embodiment, the method of flowchart 400 further includes provisioning, by host software, the secure flash memory by enabling a secure functionality. In an aspect of this embodiment, provisioning the secure flash memory includes provisioning the boot firmware in the secure flash memory. In accordance with this aspect, provisioning the secure flash memory includes provisioning the reference hash of the read-only portions in the secure flash memory. In an example implementation, the host software 704 provisions the secure flash memory 702 by enabling the secure functionality.

In another example embodiment, the method of flowchart 400 further includes calculating, by the secure flash memory, the hash of the designated portion of the firmware based at least on the secure flash memory being powered on. In an example implementation, the first hash calculation logic 732 calculates a hash of the designated portion 712 of the firmware 708 to provide the calculated portion hash 758, based at least on the secure flash memory 702 being powered on.

In yet another example embodiment, the method of flowchart 400 further includes calculating, by the boot firmware, the hash of the read-only portions based at least on a reboot of the device on which the firmware executes. In an example implementation, the second hash calculation logic 740 calculates a hash of the read-only portions 714A-714N to provide the calculated portions hash 762, based at least on a reboot of the device 706 on which the firmware 708 executes.

In still another example embodiment, the method of flowchart 400 further includes, based at least on validation of the read-only portions being unsuccessfully attempted, triggering, by the boot firmware, a warning that at least the subset of the read-only portions is not valid by causing a light-emitting diode to blink. In an example implementation, based at least on validation of the read-only portions 714A-714N being unsuccessfully attempted, the second validation logic 742 triggers a warning, which indicates that at least the subset of the read-only portions 714A-714N is not valid, by providing a control signal 764, which causes the light-emitting diode 766 to blink.

In another example embodiment, the method of flowchart 400 further includes, based at least on validation of the read-only portions being unsuccessfully attempted, discontinuing, by the boot firmware, the boot of the firmware. In an example implementation, based at least on validation of the read-only portions 714A-714N being unsuccessfully attempted, the second validation logic 742 discontinues the boot of the firmware 708. In accordance with this embodiment, downloading the image of the read-only portions is performed based at least on the boot of the firmware being discontinued.

In yet another example embodiment, the method of flowchart 400 further includes causing, by the boot firmware, a kernel of a device on which the firmware executes to initiate a boot of a root file system, to mount the root file system, and to call an application, which launches other applications, on the root file system. In an example implementation, the boot completion logic 738 causes the kernel 750 of the device 706 on which the firmware 708 executes to initiate a boot of the root file system 768, to mount the root file system 768, and to call an application, which launches other applications, on the root file system 768.

In an example embodiment, steps 412 and 414 of flowchart 400 are replaced with steps 502 and 504 of flowchart 500 shown in FIG. 5. As shown in FIG. 5, the method of flowchart 500 begins at step 502. In step 502, the read-only portions in the firmware are replaced, by the boot firmware, with the image of the read-only portions that is validated by the boot firmware. For instance, the read-only portions may be replaced with the image of the read-only portions based at least on the image of the read-only portions being validated. In an example implementation, the portion-validating boot firmware 716 replaces the read-only portions 714A-714N in the firmware 708 with the image of the read-only portions 714A-714N that is validated by the portion-validating boot firmware 716.

At step 504, the boot of the firmware is completed by the boot firmware (e.g., based at least on the read-only portions in the firmware being replaced with the image of the read-only portions that is validated by the boot firmware). In an example implementation, the portion-validating boot firmware 716 completes the boot of the firmware 708.

In another example embodiment, steps 412 and 414 of flowchart 400 are replaced with steps 602, 604, and 606 of flowchart 600 shown in FIG. 6. As shown in FIG. 6, the method of flowchart 600 begins at step 602. In step 602, the image of the read-only portions, which is downloaded from the known server to the main memory of the device, is booted from a random-access memory (e.g., a double-data-rate random-access memory (DDR RAM)) by the boot firmware. For instance, the image of the read-only portions may be booted from the random-access memory based at least on the image of the read-only portions being validated. In an example implementation, the portion-validating boot firmware 716 boots the image of the read-only portions 714A-714N, which is downloaded from the known server to the main memory 748 of the device 706, from the random-access memory.

At step 604, the boot of the firmware is completed by the boot firmware (e.g., based at least on the image of the read-only portions being booted from the random-access memory). In an example implementation, the portion-validating boot firmware 716 completes the boot of the firmware 708.

At step 606, the read-only portions in the firmware are replaced, by the runtime firmware, with the image of the read-only portions via a firmware update process (e.g., based at least on the boot of the firmware being completed). The runtime firmware is the firmware that runs on the device during runtime. In an example implementation, the firmware 708 that runs on the device 706 during runtime replaces the read-only portions 714A-714N in the firmware 708 with the image of the read-only portions 714A-714N via the firmware update process.

It will be recognized that the computing device 700 may not include one or more of the secure flash memory 702, the host software 704, the device 706, the firmware 708, the reference designated portion hash 710, the designated portion 712, the read-only portions 714A-714N, the portion-validating boot firmware 716, the reference portions hash 718, the first hash calculation logic 732, the first validation logic 734, the boot initiation logic 736, the boot completion logic 738, the second hash calculation logic 740, the second validation logic 742, the runtime validation logic 746, the main memory 748, the kernel 750, the applications 752, the libraries 754, the drivers 756, and/or the light-emitting diode 766. Furthermore, the computing device 700 may include components in addition to or in lieu of the secure flash memory 702, the host software 704, the device 706, the firmware 708, the reference designated portion hash 710, the designated portion 712, the read-only portions 714A-714N, the portion-validating boot firmware 716, the reference portions hash 718, the first hash calculation logic 732, the first validation logic 734, the boot initiation logic 736, the boot completion logic 738, the second hash calculation logic 740, the second validation logic 742, the runtime validation logic 746, the main memory 748, the kernel 750, the applications 752, the libraries 754, the drivers 756, and/or the light-emitting diode 766.

Figure 8:
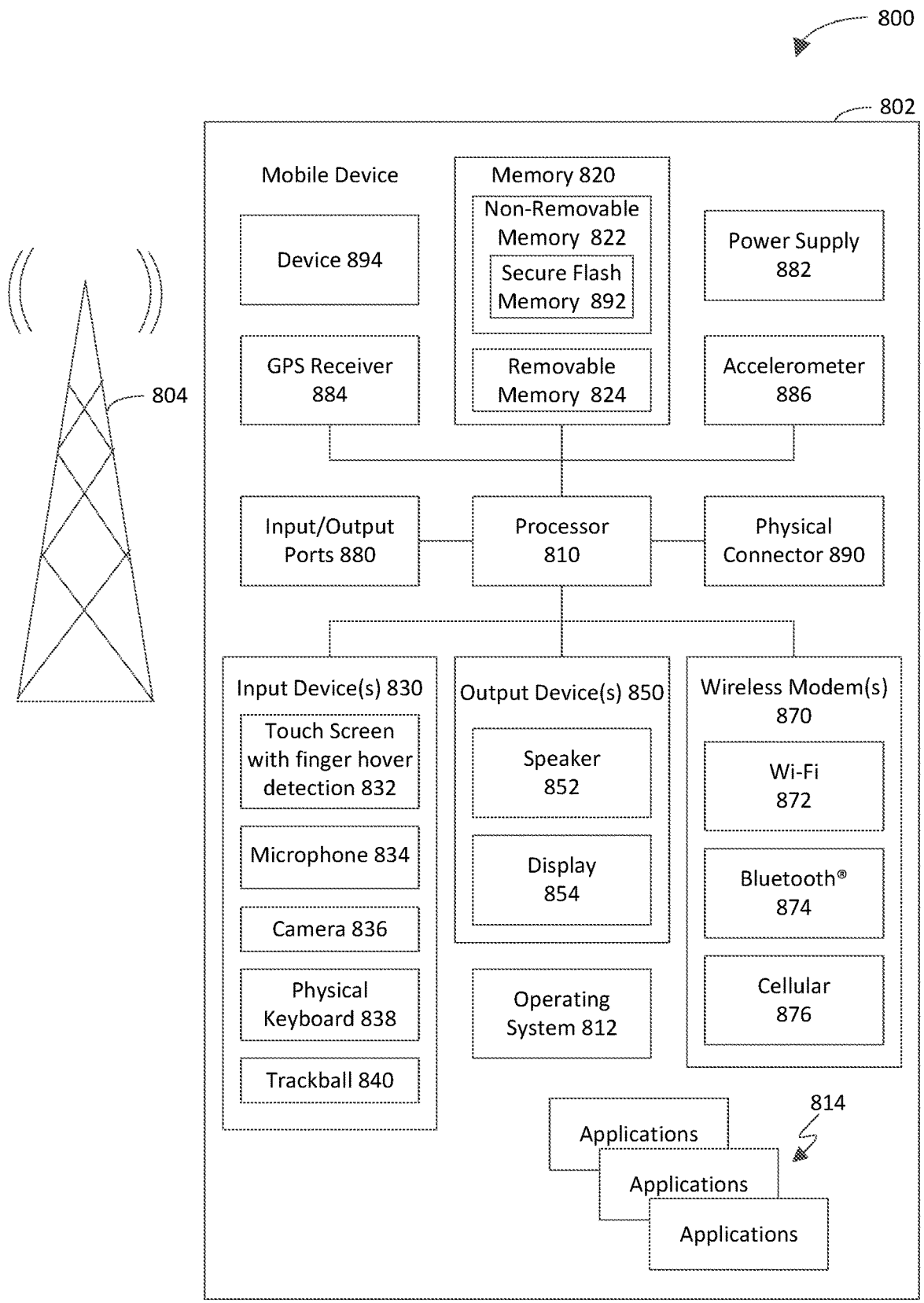
FIG. 8 is a system diagram of an example mobile device in accordance with an embodiment.

FIG. 8 is a system diagram of an example mobile device 800 including a variety of optional hardware and software components, shown generally as 802. Any components 802 in the mobile device may communicate with any other component, though not all connections are shown, for ease of illustration. The mobile device 800 may be any of a variety of computing devices (e.g., cell phone, smartphone, handheld computer, Personal Digital Assistant (PDA), etc.) and may allow wireless two-way communications with one or more mobile communications networks 804, such as a cellular or satellite network, or with a local area or wide area network.

The mobile device 800 includes a processor 810 (e.g., signal processor, microprocessor, ASIC, or other control and processing logic circuitry) for performing such tasks as signal coding, data processing, input/output processing, power control, and/or other functions. An operating system 812 may control the allocation and usage of the components 802 and support for one or more applications 814 (a.k.a. application programs). The applications 814 may include common mobile computing applications (e.g., email applications, calendars, contact managers, web browsers, messaging applications) and any other computing applications (e.g., word processing applications, mapping applications, media player applications).

The mobile device 800 includes a device 894, which is operable in a manner similar to the device 106 described above with reference to FIG. 1 and/or the device 706 described above with reference to FIG. 8.

The mobile device 800 includes memory 820. The memory 820 may include non-removable memory 822 and/or removable memory 824. The non-removable memory 822 may include random access memory (RAM), read-only memory (ROM), flash memory, a hard disk, or other well-known memory storage technologies. For instance, non-removable memory 822 is shown in FIG. 8 to include secure flash memory 892, which is operable in a manner similar to the secure flash memory 102 described above with reference to FIG. 1 and/or the secure flash memory 702 described above with reference to FIG. 7. The removable memory 824 may include flash memory or a Subscriber Identity Module (SIM) card, which is well known in Global System for Mobile Communications (GSM) systems, or other well-known memory storage technologies, such as "smart cards." The memory 820 may store data and/or code for running the operating system 812, the applications 814, and attestation client code 894. Example data may include web pages, text, images, sound files, video data, or other data sets to be sent to and/or received from one or more network servers or other devices via one or more wired or wireless networks. Memory 820 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 800 may support one or more input devices 830, such as a touch screen 832, microphone 834, camera 836, physical keyboard 838 and/or trackball 840 and one or more output devices 850, such as a speaker 852 and a display 854. Touch screens, such as the touch screen 832, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 832 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 832 and display 854 may be combined in a single input/output device. The input devices 830 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 may include speech-recognition software as part of a voice control interface that allows a user to operate the mobile device 800 via voice commands. Furthermore, the mobile device 800 may include input devices and software that allows for user interaction via a user's spatial gestures, such as detecting and interpreting gestures to provide input to a gaming application.

Wireless modem(s) 870 may be coupled to antenna(s) (not shown) and may support two-way communications between the processor 810 and external devices, as is well understood in the art. The modem(s) 870 are shown generically and may include a cellular modem 876 for communicating with the mobile communication network 804 and/or other radio-based modems (e.g., Bluetooth® 874 and/or Wi-Fi 872). At least one of the wireless modem(s) 870 is typically configured for communication with one or more cellular networks, such as a GSM network for data and voice communications within a single cellular network, between cellular networks, or between the mobile device and a public switched telephone network (PSTN).

The mobile device 800 may further include at least one input/output port 880, a power supply 882, a satellite navigation system receiver 884, such as a Global Positioning System (GPS) receiver, an accelerometer 886, and/or a physical connector 890, which may be a universal serial bus (USB) port, IEEE 1394 (FireWire) port, and/or RS-232 port. The illustrated components 802 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Figure 9:
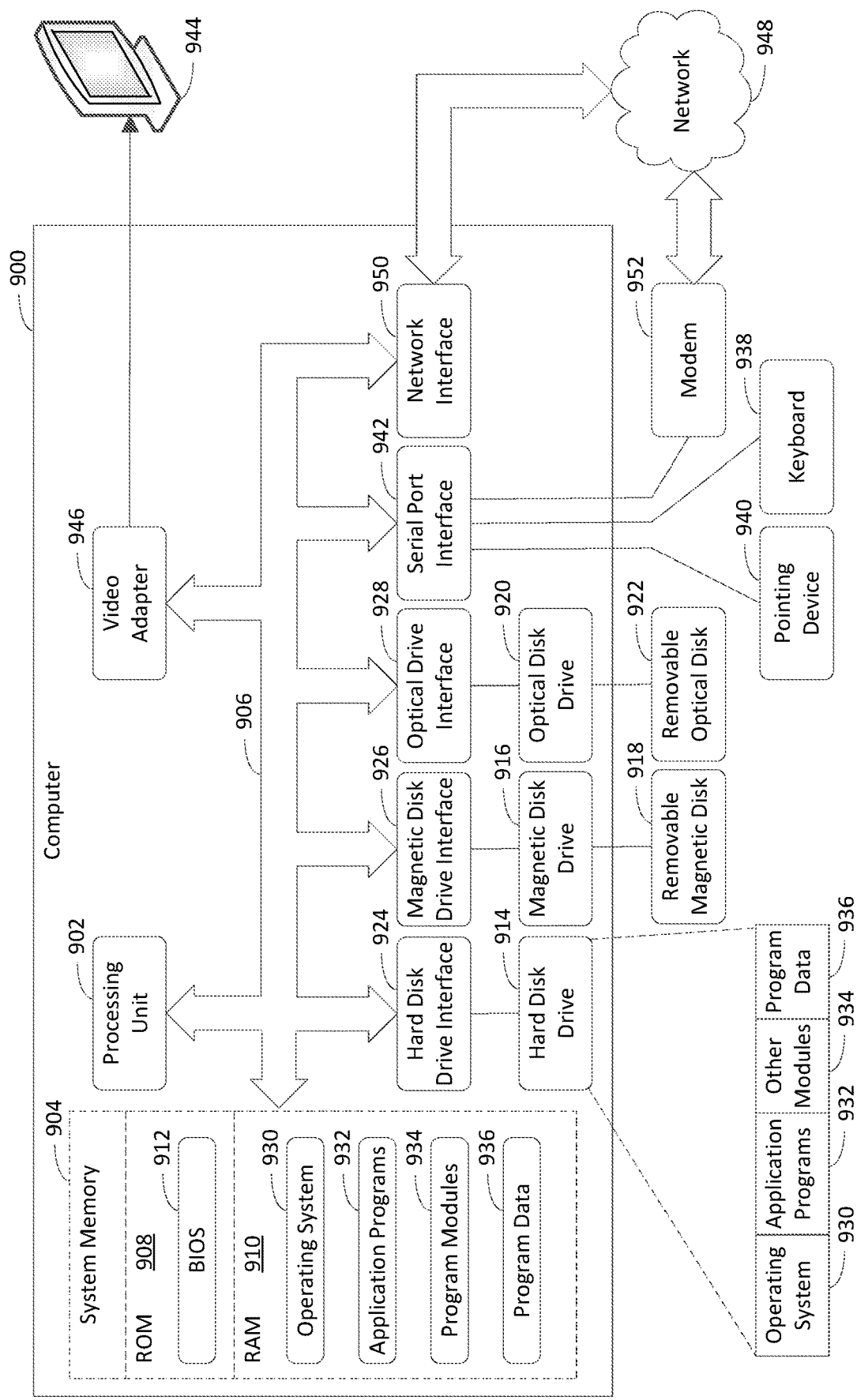
FIG. 9 depicts an example computer in which embodiments may be implemented.

II. Further Discussion of Some Example Embodiments (A1) A first example computing system (FIG. 1, 100; FIG. 2, 224; FIG. 7, 700; FIG. 8, 802; FIG. 9, 900) comprises a secure flash memory (FIG. 1, 102; FIG. 2, 202; FIG. 7, 702; FIG. 8, 892) and a device (FIG. 1, 106; FIG. 2, 206; FIG. 7, 706; FIG. 8, 894). The secure flash memory stores (FIG. 3, 302) firmware (FIG. 1, 108; FIG. 7, 708) that comprises boot firmware (FIG. 1, 116; FIG. 2, 216; FIG. 7, 716), a plurality of read-only portions (FIG. 1, 114; FIG. 7, 714A714N), and a reference hash (FIG. 1, 118; FIG. 7, 718) of the plurality of read-only portions. The secure flash memory calculates (FIG. 3, 304) a hash of a designated portion (FIG. 1, 112; FIG. 7, 712) of the firmware to provide a calculated hash (FIG. 7, 758) of the designated portion. The designated portion of the firmware comprises the boot firmware and the hash of the plurality of read-only portions. The secure flash memory validates (FIG. 3, 306) the designated portion of the firmware by comparing the calculated hash of the designated portion and a reference hash (FIG. 1, 110; FIG. 7, 710) of the designated portion that is securely stored in the secure flash memory. The device executes the firmware. Based at least on the designated portion of the firmware being validated, the boot firmware initiates (FIG. 3, 308) a boot of the firmware by calculating a hash of the plurality of read-only portions to provide a calculated hash (FIG. 7, 762) of the plurality of read-only portions. Based at least on the designated portion of the firmware being validated, the boot firmware validates (FIG. 3, 310) the plurality of read-only portions by comparing the calculated hash of the plurality of read-only portions and the reference hash of the plurality of read-only portions. Based at least on the plurality of read-only portions being validated, the boot firmware completes (FIG. 3, 312) the boot of the firmware.

(A2) In the example computing system of A1, further comprising: host software that provisions the secure flash memory by enabling a secure functionality.

(A3) In the example computing system of any of A1-A2, wherein the designated portion of the firmware is included in a manifest that is signed with a signing key of a trusted entity.

(A4) In the example computing system of any of A1-A3, wherein the manifest includes metadata that specifies a size of the designated portion of the firmware and a start address of the designated portion.

(A5) In the example computing system of any of A1-A4, wherein the secure flash memory being powered on triggers the secure flash memory to calculate the hash of the designated portion of the firmware.

(A6) In the example computing system of any of A1-A5, wherein a reboot of the device on which the firmware executes triggers the boot firmware to calculate the hash of the plurality of read-only portions.

(A7) In the example computing system of any of A1-A6, further comprising: host software that, when executed, performs the following operations: change a state of the designated portion of the firmware from a read-only state in which designated portion is not capable of being updated by the firmware to a writeable state in which the designated portion is capable of being updated by the firmware; and based at least on the state of the designated portion of the firmware being changed from the read-only state to the writable state, update the designated portion of the firmware.

(A8) In the example computing system of any of A1-A7, wherein the boot firmware causes a kernel of a device on which the firmware executes to perform the following operations: initiate a boot of a root file system; mount the root file system; and call an application, which launches other applications, on the root file system.

(B1) A second example computing system (FIG. 1, 100; FIG. 2, 224; FIG. 7, 700; FIG. 8, 802; FIG. 9, 900) comprises a secure flash memory (FIG. 1, 102; FIG. 2, 202; FIG. 7, 702; FIG. 8, 892) and a device (FIG. 1, 106; FIG. 2, 206; FIG. 7, 706; FIG. 8, 894). The secure flash memory stores (FIG. 4, 402) firmware (FIG. 1, 108; FIG. 7, 708) that comprises boot firmware (FIG. 1, 116; FIG. 2, 216; FIG. 7, 716), a plurality of read-only portions (FIG. 1, 114; FIG. 7, 714A714N), and a reference hash (FIG. 1, 118; FIG. 7, 718) of the plurality of read-only portions. The secure flash memory validates (FIG. 4, 404) a designated portion (FIG. 1, 112; FIG. 7, 712) of the firmware, which comprises the boot firmware and the reference hash of the plurality of read-only portions, based at least on a calculated hash (FIG. 7, 758) of the designated portion and a reference hash (FIG. 1, 110; FIG. 7, 710) of the designated portion that is securely stored in the secure flash memory being same. The device executes the firmware. Based at least on the designated portion of the firmware being validated, the boot firmware (FIG. 4, 406) initiates a boot of the firmware by unsuccessfully attempting to validate the plurality of read-only portions based at least on a calculated hash (FIG. 7, 762) of the plurality of read-only portions and the reference hash of the plurality of read-only portions not being same. Based at least on validation of the plurality of read-only portions being unsuccessfully attempted, the boot firmware downloads (FIG. 4, 408) an image of the plurality of read-only portions from a known server to main memory (FIG. 7, 748) of the device on which the firmware executes. The boot firmware validates (FIG. 4, 410) the image of the plurality of read-only portions based at least on a calculated hash of the image and the reference hash of the plurality of read-only portions being same. Based at least on the image of the plurality of read-only portions being validated, the boot firmware or runtime firmware replaces (FIG. 4, 412) the plurality of read-only portions in the firmware with the image of the plurality of read-only portions. Based at least on the image of the plurality of read-only portions being validated, the boot firmware completes (FIG. 4, 414) the boot of the firmware.

(B2) In the example computing system of B1, wherein, based at least on validation of the plurality of read-only portions being unsuccessfully attempted, the boot firmware triggers a warning that at least the subset of the plurality of read-only portions is not valid by causing a light-emitting diode to blink.

(B3) In the example computing system of any of B1-B2, wherein the boot firmware performs the following operations: based at least on validation of the plurality of read-only portions being unsuccessfully attempted, discontinue the boot of the firmware; and download the image of the plurality of read-only portions based at least on the boot of the firmware being discontinued.

(B4) In the example computing system of any of B1-B3, further comprising: host software that provisions the secure flash memory by enabling a secure functionality.

(B5) In the example computing system of any of B1-B4, wherein the secure flash memory calculates the hash of the designated portion of the firmware based at least on the secure flash memory being powered on.

(B6) In the example computing system of any of B1-B5, wherein the boot firmware calculates the hash of the plurality of read-only portions based at least on a reboot of the device on which the firmware executes.

(B7) In the example computing system of any of B1-B6, wherein the boot firmware causes a kernel of a device on which the firmware executes to perform the following operations: initiate a boot of a root file system; mount the root file system; and call an application, which launches other applications, on the root file system.

(B8) In the example computing system of any of B1-B7, wherein the boot firmware performs the following operations: based at least on the image of the plurality of read-only portions being validated, replace the plurality of read-only portions in the firmware with the image of the plurality of read-only portions that is validated by the boot firmware; and based at least on the plurality of read-only portions in the firmware being replaced with the image of the plurality of read-only portions that is validated by the boot firmware, complete the boot of the firmware.

(B9) In the example computing system of any of B1-B8, wherein the boot firmware performs the following operations: based at least on the image of the plurality of read-only portions being validated, boot the image of the plurality of read-only portions, which is downloaded from the known server to the main memory of the device, from a random-access memory; and based at least on the image of the plurality of read-only portions being booted from the random-access memory, complete the boot of the firmware; and wherein the runtime firmware performs the following operation: based at least on the boot of the firmware being completed, replace the plurality of read-only portions in the firmware with the image of the plurality of read-only portions via a firmware update process.

(C1) A first example method is implemented by a computing system (FIG. 1, 100; FIG. 2, 224; FIG. 7, 700; FIG.

8, 802; FIG. 9, 900). The method comprises storing (FIG. 3, 302), by a secure flash memory (FIG. 1, 102; FIG. 2, 202; FIG. 7, 702; FIG. 8, 892) in the computing system, firmware (FIG. 1, 108; FIG. 7, 708) that comprises boot firmware (FIG. 1, 116; FIG. 2, 216; FIG. 7, 716), a plurality of read-only portions (FIG. 1, 114; FIG. 7, 714A714N), and a reference hash (FIG. 1, 118; FIG. 7, 718) of the plurality of read-only portions. The method further comprises calculating (FIG. 3, 304), by the secure flash memory, a hash of a designated portion (FIG. 1, 112; FIG. 7, 712) of the firmware to provide a calculated hash (FIG. 7, 758) of the designated portion. The designated portion of the firmware comprises the boot firmware and the hash of the plurality of read-only portions. The method further comprises validating (FIG. 3, 306), by the secure flash memory, the designated portion of the firmware by comparing the calculated hash of the designated portion and a reference hash (FIG. 1, 110; FIG. 7, 710) of the designated portion that is securely stored in the secure flash memory. The method further comprises, based at least on the designated portion of the firmware being validated, initiating (FIG. 3, 308), by the boot firmware, a boot of the firmware by calculating a hash of the plurality of read-only portions to provide a calculated hash (FIG. 7, 762) of the plurality of read-only portions. The method further comprises, based at least on the designated portion of the firmware being validated, validating (FIG. 3, 310), by the boot firmware, the plurality of read-only portions by comparing the calculated hash of the plurality of read-only portions and the reference hash of the plurality of read-only portions. The method further comprises, based at least on the plurality of read-only portions being validated, completing (FIG. 3, 312), by the boot firmware, the boot of the firmware.

(C2) In the example method of C1, further comprising: provisioning, by host software, the secure flash memory by enabling a secure functionality.

(C3) In the example method of any of C1-C2, wherein the designated portion of the firmware is included in a manifest that is signed with a signing key of a trusted entity.

(C4) In the example method of any of C1-C3, wherein the manifest includes metadata that specifies a size of the designated portion of the firmware and a start address of the designated portion.

(C5) In the example method of any of C1-C4, wherein calculation of the hash of the designated portion of the firmware is triggered by the secure flash memory being powered on.

(C6) In the example method of any of C1-C5, wherein calculation of the hash of the plurality of read-only portions is triggered by a reboot of the device on which the firmware executes.

(C7) In the example method of any of C1-C6, further comprising: changing, by host software executed by the computing system, a state of the designated portion of the firmware from a read-only state in which designated portion is not capable of being updated by the firmware to a writeable state in which the designated portion is capable of being updated by the firmware; and based at least on the state of the designated portion of the firmware being changed from the read-only state to the writable state, updating, by the host software, the designated portion of the firmware.

(C8) In the example method of any of C1-C7, further comprising: causing, by the boot firmware, a kernel of a device on which the firmware executes to perform the following operations: initiating a boot of a root file system; mounting the root file system; and calling an application, which launches other applications, on the root file system.

(D1) A second example method is implemented by a computing system (FIG. 1, 100; FIG. 2, 224; FIG. 7, 700; FIG. 8, 802; FIG. 9, 900). The method comprises storing (FIG. 4, 402), by a secure flash memory (FIG. 1, 102; FIG. 2, 202; FIG. 7, 702; FIG. 8, 892) in the computing system, firmware (FIG. 1, 108; FIG. 7, 708) that comprises boot firmware (FIG. 1, 116; FIG. 2, 216; FIG. 7, 716), a plurality of read-only portions (FIG. 1, 114; FIG. 7, 714A714N), and a reference hash (FIG. 1, 118; FIG. 7, 718) of the plurality of read-only portions. The method further comprises validating (FIG. 4, 404), by the secure flash memory, a designated portion (FIG. 1, 112; FIG. 7, 712) of the firmware, which comprises the boot firmware and the reference hash of the plurality of read-only portions, based at least on a calculated hash (FIG. 7, 758) of the designated portion and a reference hash (FIG. 1, 110; FIG. 7, 710) of the designated portion that is securely stored in the secure flash memory being same. The method further comprises, based at least on the designated portion of the firmware being validated, initiating (FIG. 4, 406), by the boot firmware, a boot of the firmware by unsuccessfully attempting to validate the plurality of read-only portions based at least on a calculated hash (FIG. 7, 762) of the plurality of read-only portions and the reference hash of the plurality of read-only portions not being same. The method further comprises, based at least on validation of the plurality of read-only portions being unsuccessfully attempted, downloading (FIG. 4, 408), by the boot firmware, an image of the plurality of read-only portions from a known server to main memory (FIG. 7, 748) of a device (FIG. 1, 106; FIG. 2, 206; FIG. 7, 706; FIG. 8, 894) on which the firmware executes. The method further comprises validating (FIG. 4, 410), by the boot firmware, the image of the plurality of read-only portions based at least on a calculated hash of the image and the reference hash of the plurality of read-only portions being same. The method further comprises, based at least on the image of the plurality of read-only portions being validated, replacing (FIG. 4, 412), by the boot firmware or runtime firmware, the plurality of read-only portions in the firmware with the image of the plurality of read-only portions. The method further comprises, based at least on the image of the plurality of read-only portions being validated, completing (FIG. 4, 412), by the boot firmware, the boot of the firmware.

(D2) In the example method of D1, further comprising: based at least on validation of the plurality of read-only portions being unsuccessfully attempted, triggering, by the boot firmware, a warning that at least the subset of the plurality of read-only portions is not valid by causing a light-emitting diode to blink.

(D3) In the example method of any of D1-D2, further comprising: based at least on validation of the plurality of read-only portions being unsuccessfully attempted, discontinuing, by the boot firmware, the boot of the firmware; wherein downloading the image of the plurality of read-only portions is performed based at least on the boot of the firmware being discontinued.

(D4) In the example method of any of D1-D3, further comprising: provisioning, by host software, the secure flash memory by enabling a secure functionality.

(D5) In the example method of any of D1-D4, further comprising: calculating, by the secure flash memory, the hash of the designated portion of the firmware based at least on the secure flash memory being powered on.

(D6) In the example method of any of D1-D5, further comprising: calculating, by the boot firmware, the hash of the plurality of read-only portions based at least on a reboot of the device on which the firmware executes.

(D7) In the example method of any of D1-D6, further comprising: causing, by the boot firmware, a kernel of a device on which the firmware executes to perform the following operations: initiating a boot of a root file system; mounting the root file system; and calling an application, which launches other applications, on the root file system.

(D8) In the example method of any of D1-D7, wherein replacing the plurality of read-only portions in the firmware with the image comprises: based at least on the image of the plurality of read-only portions being validated, replacing, by the boot firmware, the plurality of read-only portions in the firmware with the image of the plurality of read-only portions that is validated by the boot firmware; and wherein completing the boot of the firmware comprises: based at least on the plurality of read-only portions in the firmware being replaced with the image of the plurality of read-only portions that is validated by the boot firmware, completing, by the boot firmware, the boot of the firmware.

(D9) In the example method of any of D1-D8, further comprising: based at least on the image of the plurality of read-only portions being validated, booting, by the boot firmware, the image of the plurality of read-only portions, which is downloaded from the known server to the main memory of the device, from a random-access memory; wherein completing the boot of the firmware comprises: based at least on the image of the plurality of read-only portions being booted from the random-access memory, completing, by the boot firmware, the boot of the firmware; and wherein replacing the plurality of read-only portions in the firmware with the image comprises: based at least on the boot of the firmware being completed, replacing, by the runtime firmware, the plurality of read-only portions in the firmware with the image of the plurality of read-only portions via a firmware update process.

(E1) A first example computer program product (FIG. 8, 824; FIG. 9, 918, 922) comprising a computer-readable storage medium having instructions recorded thereon for enabling a processor-based system (FIG. 1, 100; FIG. 2, 224; FIG. 7, 700; FIG. 8, 802; FIG. 9, 900) to perform operations. The operations comprise storing (FIG. 3, 302), by a secure flash memory (FIG. 1, 102; FIG. 2, 202; FIG. 7, 702; FIG. 8, 892) in the processor-based system, firmware (FIG. 1, 108; FIG. 7, 708) that comprises boot firmware(FIG. 1, 116; FIG. 2, 216; FIG. 7, 716), a plurality of read-only portions (FIG. 1, 114; FIG. 7, 714A714N), and a reference hash (FIG. 1, 118; FIG. 7, 718) of the plurality of read-only portions. The operations further comprise calculating (FIG. 3, 304), by the secure flash memory, a hash of a designated portion (FIG. 1, 112; FIG. 7, 712) of the firmware to provide a calculated hash (FIG. 7, 758) of the designated portion. The designated portion of the firmware comprises the boot firmware and the hash of the plurality of read-only portions. The operations further comprise validating (FIG. 3, 306), by the secure flash memory, the designated portion of the firmware by comparing the calculated hash of the designated portion and a reference hash (FIG. 1, 110; FIG. 7, 710) of the designated portion that is securely stored in the secure flash memory. The operations further comprise, based at least on the designated portion of the firmware being validated, initiating (FIG. 3, 308), by the boot firmware, a boot of the firmware by calculating a hash of the plurality of read-only portions to provide a calculated hash (FIG. 7, 762) of the plurality of read-only portions. The operations further comprise, based at least on the designated portion of the firmware being validated, validating (FIG. 3, 310), by the boot firmware, the plurality of read-only portions by comparing the calculated hash of the plurality of read-only portions and the reference hash of the plurality of read-only portions. The operations further comprise, based at least on the plurality of read-only portions being validated, completing (FIG. 3, 312), by the boot firmware, the boot of the firmware.

(F1) A second example computer program product (FIG. 8, 824; FIG. 9, 918, 922) comprising a computer-readable storage medium having instructions recorded thereon for enabling a processor-based system (FIG. 1, 100; FIG. 2, 224; FIG. 7, 700; FIG. 8, 802; FIG. 9, 900) to perform operations. The operations comprise storing (FIG. 4, 402), by a secure flash memory (FIG. 1, 102; FIG. 2, 202; FIG. 7, 702; FIG. 8, 892) in the processor-based system, firmware (FIG. 1, 108; FIG. 7, 708) that comprises boot firmware (FIG. 1, 116; FIG. 2, 216; FIG. 7, 716), a plurality of read-only portions (FIG. 1, 114; FIG. 7, 714A714N), and a reference hash (FIG. 1, 118; FIG. 7, 718) of the plurality of read-only portions. The operations further comprise validating (FIG. 4, 404), by the secure flash memory, a designated portion (FIG. 1, 112; FIG. 7, 712) of the firmware, which comprises the boot firmware and the reference hash of the plurality of read-only portions, based at least on a calculated hash (FIG. 7, 758) of the designated portion and a reference hash (FIG. 1, 110; FIG. 7, 710) of the designated portion that is securely stored in the secure flash memory being same. The operations further comprise, based at least on the designated portion of the firmware being validated, initiating (FIG. 4, 406), by the boot firmware, a boot of the firmware by unsuccessfully attempting to validate the plurality of read-only portions based at least on a calculated hash (FIG. 7, 762) of the plurality of read-only portions and the reference hash of the plurality of read-only portions not being same. The operations further comprise, based at least on validation of the plurality of read-only portions being unsuccessfully attempted, downloading (FIG. 4, 408), by the boot firmware, an image of the plurality of read-only portions from a known server to main memory (FIG. 7, 748) of a device (FIG. 1, 106; FIG. 2, 206; FIG. 7, 706; FIG. 8, 894) on which the firmware executes. The operations further comprise validating (FIG. 4, 410), by the boot firmware, the image of the plurality of read-only portions based at least on a calculated hash of the image and the reference hash of the plurality of read-only portions being same. The operations further comprise, based at least on the image of the plurality of read-only portions being validated, replacing (FIG. 4, 412), by the boot firmware or runtime firmware, the plurality of read-only portions in the firmware with the image of the plurality of read-only portions. The operations further comprise, based at least on the image of the plurality of read-only portions being validated, completing (FIG. 4, 412), by the boot firmware, the boot of the firmware.

III. Example Computer System

FIG. 9 depicts an example computer 900 in which embodiments may be implemented. The computing system 100 shown in FIG. 1 and/or the computing system 700 shown in FIG. 7 may be implemented using computer 900, including one or more features of computer 900 and/or alternative features. Computer 900 may be a general-purpose computing device in the form of a conventional personal computer, a mobile computer, or a workstation, for example, or computer 900 may be a special purpose computing device. The description of computer 900 provided herein is provided for purposes of illustration, and is not intended to be limiting. Embodiments may be implemented in further types of computer systems, as would be known to persons skilled in the relevant art(s).

As shown in FIG. 9, computer 900 includes a processing unit 902, a system memory 904, and a bus 906 that couples various system components including system memory 904 to processing unit 902. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system (BIOS) 912 is stored in ROM 908.

Computer 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 930, one or more application programs 932, other program modules 934, and program data 936. Application programs 932 or program modules 934 may include, for example, computer program logic for implementing any one or more of (e.g., at least a portion of) the host software 104, the firmware 108, the designated portion 112, the read-only portions 114, the portion-validating boot firmware 116, the host software 204, the boot firmware 216, the host software 704, the firmware 708, the designated portion 712, the read-only portions 714A-714N, the portion-validating boot firmware 716, the boot initiation logic 736, the boot completion logic 738, the second hash calculation logic 740, the second validation logic 742, the runtime validation logic 746, the kernel 750, the applications 752, the libraries 754, the drivers 756, flowchart 300 (including any step of flowchart 300), flowchart 400 (including any step of flowchart 400), flowchart 500 (including any step of flowchart 500), and/or flowchart 600 (including any step of flowchart 600), as described herein.

A user may enter commands and information into the computer 900 through input devices such as keyboard 938 and pointing device 940. Other input devices (not shown) may include a microphone, joystick, game pad, satellite dish, scanner, touch screen, camera, accelerometer, gyroscope, or the like. These and other input devices are often connected to the processing unit 902 through a serial port interface 942 that is coupled to bus 906, but may be connected by other interfaces, such as a parallel port, game port, or a universal serial bus (USB).

A display device 944 (e.g., a monitor) is also connected to bus 906 via an interface, such as a video adapter 946. In addition to display device 944, computer 900 may include other peripheral output devices (not shown) such as speakers and printers.

Computer 900 is connected to a network 948 (e.g., the Internet) through a network interface or adapter 950, a modem 952, or other means for establishing communications over the network. Modem 952, which may be internal or external, is connected to bus 906 via serial port interface 942.

As used herein, the terms "computer program medium" and "computer-readable storage medium" are used to generally refer to media (e.g., non-transitory media) such as the hard disk associated with hard disk drive 914, removable magnetic disk 918, removable optical disk 922, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, communication media includes wireless media such as acoustic, RF, infrared and other wireless media, as well as wired media. Example embodiments are also directed to such communication media.

As noted above, computer programs and modules (including application programs 932 and other program modules 934) may be stored on the hard disk, magnetic disk, optical disk, ROM, or RAM. Such computer programs may also be received via network interface 950 or serial port interface 942. Such computer programs, when executed or loaded by an application, enable computer 900 to implement features of embodiments discussed herein. Accordingly, such computer programs represent controllers of the computer 900.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate example embodiments of the present disclosure. However, the scope of the present disclosure is not limited to these embodiments, but is instead defined by the appended claims. Thus, embodiments beyond those shown in the accompanying drawings, such as modified versions of the illustrated embodiments, may nevertheless be encompassed by the present disclosure.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first," "second," and "third" are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A computing system comprising:
    a secure flash memory that stores firmware that comprises boot firmware, a plurality of read-only portions, and a reference hash of the plurality of read-only portions, wherein the secure flash memory performs the following operations:
        calculate a hash of a designated portion of the firmware to provide a calculated hash of the designated portion, the designated portion of the firmware comprising the boot firmware and the reference hash of the plurality of read-only portions; and
        validate the designated portion of the firmware by comparing the calculated hash of the designated portion and a reference hash of the designated portion that is securely stored in the secure flash memory;
    a device that executes the firmware, wherein the boot firmware performs the following operations:
        based at least on the designated portion of the firmware being validated, initiate a boot of the firmware by calculating a hash of the plurality of read-only portions to provide a calculated hash of the plurality of read-only portions;
        based at least on the designated portion of the firmware being validated, validate the plurality of read-only portions by comparing the calculated hash of the plurality of read-only portions and the reference hash of the plurality of read-only portions; and
        based at least on the plurality of read-only portions being validated, complete the boot of the firmware; and
    host software that, when executed, performs the following operations:
        change a state of the designated portion of the firmware from a read-only state in which designated portion is not capable of being updated by the firmware to a writeable state in which the designated portion is capable of being updated by the firmware; and
        based at least on the state of the designated portion of the firmware being changed from the read-only state to the writable state, update the designated portion of the firmware.

2. The computing system of claim 1, further comprising:
    host software that provisions the secure flash memory by enabling a secure functionality.

3. The computing system of claim 1, wherein the designated portion of the firmware is included in a manifest that is signed with a signing key of a trusted entity.

4. The computing system of claim 3, wherein the manifest includes metadata that specifies a size of the designated portion of the firmware and a start address of the designated portion.

5. The computing system of claim 1, wherein the secure flash memory being powered on triggers the secure flash memory to calculate the hash of the designated portion of the firmware.

6. The computing system of claim 1, wherein a reboot of the device on which the firmware executes triggers the boot firmware to calculate the hash of the plurality of read-only portions.

7. The computing system of claim 1, wherein the boot firmware causes a kernel of a device on which the firmware executes to perform the following operations:
    initiate a boot of a root file system;
    mount the root file system; and
    call an application, which launches other applications, on the root file system.

8. A method implemented by a computing system, the method comprising:
    storing, by a secure flash memory in the computing system, firmware that comprises boot firmware, a plurality of read-only portions, and a reference hash of the plurality of read-only portions;
    validating, by the secure flash memory, a designated portion of the firmware, which comprises the boot firmware and the reference hash of the plurality of read-only portions, based at least on a calculated hash of the designated portion and a reference hash of the designated portion that is securely stored in the secure flash memory being same;
    based at least on the designated portion of the firmware being validated, initiating, by the boot firmware, a boot of the firmware by unsuccessfully attempting to validate the plurality of read-only portions based at least on a calculated hash of the plurality of read-only portions and the reference hash of the plurality of read-only portions not being same;
    based at least on validation of the plurality of read-only portions being unsuccessfully attempted, downloading, by the boot firmware, an image of the plurality of read-only portions from a known server to main memory of a device on which the firmware executes;
    validating, by the boot firmware, the image of the plurality of read-only portions based at least on a calculated hash of the image and the reference hash of the plurality of read-only portions being same;
    based at least on the image of the plurality of read-only portions being validated, replacing, by the boot firmware or runtime firmware, the plurality of read-only portions in the firmware with the image of the plurality of read-only portions; and
    based at least on the image of the plurality of read-only portions being validated, completing, by the boot firmware, the boot of the firmware.

9. The method of claim 8, further comprising:
based at least on validation of the plurality of read-only portions being unsuccessfully attempted, triggering, by the boot firmware, a warning that at least the subset of the plurality of read-only portions is not valid by causing a light-emitting diode to blink.

10. The method of claim 8, further comprising:
based at least on validation of the plurality of read-only portions being unsuccessfully attempted, discontinuing, by the boot firmware, the boot of the firmware;
wherein downloading the image of the plurality of read-only portions is performed based at least on the boot of the firmware being discontinued.

11. The method of claim 8, further comprising:
provisioning, by host software, the secure flash memory by enabling a secure functionality.

12. The method of claim 8, further comprising:
calculating, by the secure flash memory, the hash of the designated portion of the firmware based at least on the secure flash memory being powered on.

13. The method of claim 8, further comprising:
calculating, by the boot firmware, the hash of the plurality of read-only portions based at least on a reboot of the device on which the firmware executes.

14. The method of claim 8, further comprising:
causing, by the boot firmware, a kernel of a device on which the firmware executes to perform the following operations:
initiating a boot of a root file system;
mounting the root file system; and
calling an application, which launches other applications, on the root file system.

15. The method of claim 8, wherein replacing the plurality of read-only portions in the firmware with the image comprises:
based at least on the image of the plurality of read-only portions being validated, replacing, by the boot firmware, the plurality of read-only portions in the firmware with the image of the plurality of read-only portions that is validated by the boot firmware; and
wherein completing the boot of the firmware comprises:
based at least on the plurality of read-only portions in the firmware being replaced with the image of the plurality of read-only portions that is validated by the boot firmware, completing, by the boot firmware, the boot of the firmware.

16. The method of claim 5, further comprising:
based at least on the image of the plurality of read-only portions being validated, booting, by the boot firmware, the image of the plurality of read-only portions, which is downloaded from the known server to the main memory of the device, from a random-access memory;
wherein completing the boot of the firmware comprises:
based at least on the image of the plurality of read-only portions being booted from the random-access memory, completing, by the boot firmware, the boot of the firmware; and
wherein replacing the plurality of read-only portions in the firmware with the image comprises:
based at least on the boot of the firmware being completed, replacing, by the runtime firmware, the plurality of read-only portions in the firmware with the image of the plurality of read-only portions via a firmware update process.

17. A computer program product comprising a computer-readable storage medium having instructions recorded thereon for enabling a processor-based system to perform operations, the operations comprising:
storing, by a secure flash memory in the processor-based system, firmware that comprises boot firmware, a plurality of read-only portions, and a reference hash of the plurality of read-only portions;
calculating, by the secure flash memory, a hash of a designated portion of the firmware to provide a calculated hash of the designated portion, the designated portion of the firmware comprising the boot firmware and the reference hash of the plurality of read-only portions;
validating, by the secure flash memory, the designated portion of the firmware by comparing the calculated hash of the designated portion and a reference hash of the designated portion that is securely stored in the secure flash memory;
based at least on the designated portion of the firmware being validated, initiating, by the boot firmware, a boot of the firmware by calculating a hash of the plurality of read-only portions to provide a calculated hash of the plurality of read-only portions;
based at least on the designated portion of the firmware being validated, validating, by the boot firmware, the plurality of read-only portions by comparing the calculated hash of the plurality of read-only portions and the reference hash of the plurality of read-only portions;
based at least on the plurality of read-only portions being validated, completing, by the boot firmware, the boot of the firmware;
changing, by host software executed by the processor-based system, a state of the designated portion of the firmware from a read-only state in which designated portion is not capable of being updated by the firmware to a writeable state in which the designated portion is capable of being updated by the firmware; and
based at least on the state of the designated portion of the firmware being changed from the read-only state to the writable state, updating, by the host software, the designated portion of the firmware.

18. The computer program product of claim 17, wherein the operations further comprise:
causing, by the boot firmware, a kernel of a device on which the firmware executes to perform the following operations:
initiating a boot of a root file system;
mounting the root file system; and
calling an application, which launches other applications, on the root file system.

19. The computer program product of claim 17, wherein the designated portion of the firmware is included in a manifest that is signed with a signing key of a trusted entity; and
wherein the manifest includes metadata that specifies a size of the designated portion of the firmware and a start address of the designated portion.

20. The computer program product of claim 17, wherein the secure flash memory being powered on triggers the secure flash memory to calculate the hash of the designated portion of the firmware.

* * * * *